United States Patent
Shimomura et al.

(10) Patent No.: US 11,137,586 B2
(45) Date of Patent: Oct. 5, 2021

(54) ZOOM LENS AND IMAGE PICKUP APPARATUS

(71) Applicant: CANON KABUSHIKI KAISHA, Tokyo (JP)

(72) Inventors: Kazuya Shimomura, Utsunomiya (JP); Naotoshi Ogawa, Utsunomiya (JP); Masao Hori, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 274 days.

(21) Appl. No.: 16/284,813

(22) Filed: Feb. 25, 2019

(65) Prior Publication Data
US 2019/0265451 A1 Aug. 29, 2019

(30) Foreign Application Priority Data
Feb. 28, 2018 (JP) .............................. JP2018-034959

(51) Int. Cl.
*G02B 15/14* (2006.01)
*G02B 15/20* (2006.01)
*G02B 15/173* (2006.01)

(52) U.S. Cl.
CPC ........... *G02B 15/20* (2013.01); *G02B 15/173* (2013.01)

(58) Field of Classification Search
CPC .............. G02B 15/1431; G02B 15/173; G02B 15/143101; G02B 15/143105;
(Continued)

(56) References Cited

U.S. PATENT DOCUMENTS 9,264,638 B2 2/2016 Nakamura et al.
9,268,120 B2 2/2016 Shimomura et al.
(Continued)

FOREIGN PATENT DOCUMENTS

EP 2698660 A2 2/2014
JP 2012220901 A 11/2012
(Continued)

OTHER PUBLICATIONS

Extended European Search Report issued by the European Patent Office dated Jul. 1, 2019 corresponding to European Patent Application No. 19158451.5.
(Continued)

*Primary Examiner* — Alicia M Harrington
(74) *Attorney, Agent, or Firm* — Carter, DeLuca & Farrell LLP

(57) ABSTRACT

A zoom lens consists of, in order from the object side to the image side, a first lens unit having a positive refractive power and configured not to be moved for zooming, a second lens unit having a negative refractive power and configured to be moved for zooming, and a rear lens group including at least one lens unit. The first lens unit includes at least six lenses, a lens closest to the object side included in the first lens unit is a negative lens, and the zoom lens satisfies conditional expressions: $-1.65<f1n/f1<-1.10$; $37<v1n<48$; and $87<vpave<100$, where f1n is a focal length of the negative lens, v1n is an Abbe number of the negative lens with respect to d-line, f1 is a focal length of the first lens unit, and vpave is an average of Abbe numbers of positive lenses included in the first lens unit with respect to d-line.

7 Claims, 19 Drawing Sheets

(58) Field of Classification Search
CPC .... G02B 15/144113; G02B 15/145129; G02B 15/1461
See application file for complete search history.

(56) References Cited

U.S. PATENT DOCUMENTS

| | | |
|---|---|---|
| 9,310,592 B2 | 4/2016 | Wakazono et al. |
| 9,329,372 B2 | 5/2016 | Shimomura |
| 9,400,374 B2 | 7/2016 | Yoshimi et al. |
| 9,678,318 B2 | 6/2017 | Nakamura et al. |
| 9,716,829 B2 | 7/2017 | Shimomura |
| 9,904,043 B2 | 2/2018 | Shimomura et al. |
| 2014/0029112 A1* | 1/2014 | Sanjo .................. G02B 15/173 359/687 |
| 2014/0104467 A1* | 4/2014 | Takemoto ............ G02B 15/173 348/294 |
| 2017/0108676 A1 | 4/2017 | Hori |
| 2017/0108678 A1 | 4/2017 | Miyazawa et al. |
| 2018/0224640 A1 | 8/2018 | Shimomura |

FOREIGN PATENT DOCUMENTS

| | | |
|---|---|---|
| JP | 2016071140 A | 5/2016 |
| JP | 2017062303 A | 3/2017 |

OTHER PUBLICATIONS

Notice of the First Office Action dated May 31, 2021 by the National Intellectual Property Administration of the People's Republic of China in corresponding CN Patent Application No. 201910149244. 9, with English translation.

\* cited by examiner

ZOOM LENS AND IMAGE PICKUP APPARATUS

BACKGROUND OF THE INVENTION

Field of the Invention

The present invention relates to a zoom lens and an image pickup apparatus.

Description of the Related Art

In recent years, there has been a demand that an image pickup apparatus such as a television camera, a movie camera, or a photography camera be equipped with a zoom lens with a wide angle of view, a high zoom ratio, and high optical performance. In particular, an image pickup device, such as a CCD or CMOS sensor, used in a television or movie camera as a professional video shooting system has a substantially even resolution over the entire image pickup range. For this reason, a zoom lens using such an image pickup device is desired to have a substantially even resolution from the center to the periphery of the field.

A positive lead type zoom lens including, in order from the object side, a first lens unit having a positive refractive power and a second lens unit for zooming having a negative refractive power is known as a zoom lens with a wide angle of view and a high zoom ratio. Japanese Patent Application Laid-Open No. 2012-220901 discloses a zoom lens with a zoom ratio of 90 to 120, the zoom lens including, in order from the object side, a first lens unit having a positive refractive power and a second lens unit having a negative refractive power, the first lens unit consisting of six lenses. Further, Japanese Patent Application Laid-Open No. 2016-71140 discloses a zoom lens having a zoom ratio of approximately 20× and including, in order from the object side, a first lens unit having a positive refractive power and a second lens unit having a negative refractive power, the first lens unit consisting of six lenses.

In order for a positive lead type zoom lens with the above-described configuration to achieve high optical performance, a wide angle of view, and reduction in size at the same time, it is important to set the lens configuration, refractive power, and glass material of the first lens unit appropriately. When a wider angle of view, a higher magnification, and a smaller size are to be achieved at the same time, chromatic aberration at the telephoto end in particular is under-corrected, making it difficult to achieve favorable optical performance from the center to the periphery of the field.

The refractive powers and glass materials of the lenses in the first lens unit of the zoom lens disclosed in Japanese Patent Application Laid-Open No. 2012-220901 tend to under-correct chromatic aberration at the telephoto end when the zoom lens is designed to achieve a wider angle of view and a higher magnification. Further, the zoom lens disclosed in Japanese Patent Application Laid-Open No. 2016-71140 has a zoom ratio of approximately 20, and the refractive powers and glass materials used for the lenses in the first lens unit of this zoom lens are not optimal for a zoom lens with a zoom ratio of higher than 40.

SUMMARY OF THE INVENTION

The disclosure provides, for example, a zoom lens advantageous in a wide angle of view, a high zoom ratio, small size and weight, and high optical performance over an entire zoom range.

A zoom lens of the present invention is a zoom lens consisting of, in order from an object side to an image side, a first lens unit having a positive refractive power and configured not to be moved for zooming, a second lens unit having a negative refractive power and configured to be moved for zooming, and a rear lens group including at least one lens unit, wherein the first lens unit includes at least six lenses, a lens closest to the object side included in the first lens unit is a negative lens, and the zoom lens satisfies conditional expressions $$-1.65 < f1n/f1 < -1.10,$$

$$37 < \nu1n < 48, \text{ and}$$

$$87 < \nu pave < 100,$$

where f1n is a focal length of the negative lens, ν1n is an Abbe number of the negative lens with respect to d-line, f1 is a focal length of the first lens unit, and νpave is an average of Abbe numbers of positive lenses included in the first lens unit with respect to d-line, the Abbe number νd with respect to d-line being expressed by an expression $$\nu d = (Nd-1)/(NF-NC),$$

where NF is a refractive index with respect to F-line, NC is a refractive index with respect to C-line, and Nd is a refractive index with respect to d-line.

Further features of the present invention will become apparent from the following description of exemplary embodiments with reference to the attached drawings.

DESCRIPTION OF THE EMBODIMENTS

Preferred embodiments of the present invention are described in detail below based on the accompanying drawings.

First, the characteristics of a zoom lens of the present invention are described using conditional expressions. The zoom lens of the present invention defines the lens configuration, refractive power, and glass material of a first lens unit in order to achieve a wide angle of view, a high zoom ratio, reduction in size and weight, and high optical performance over the entire zoom range.

Figure 17A:
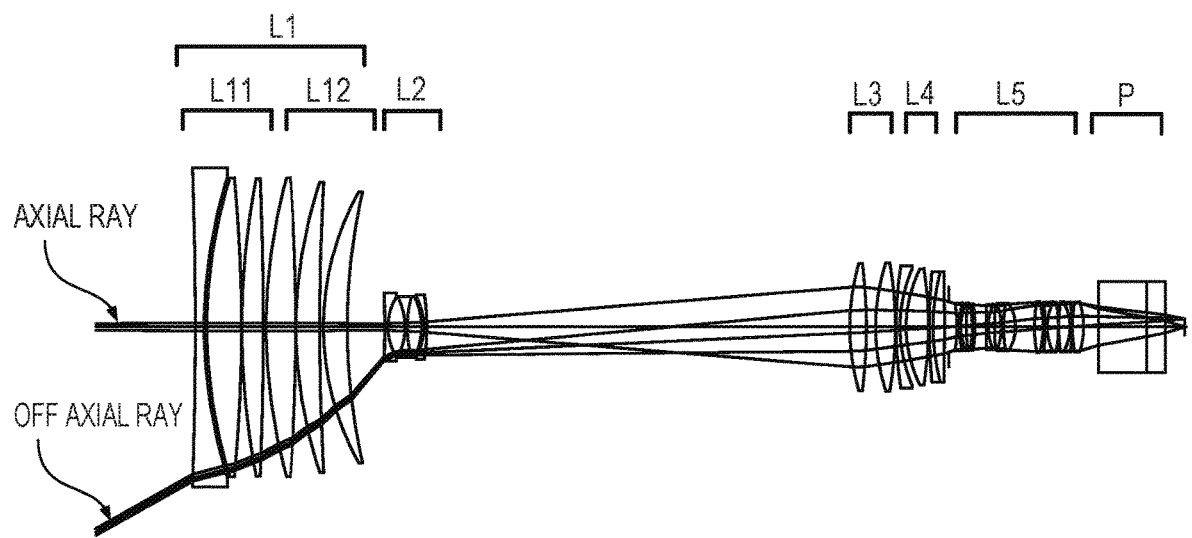
FIG. 17A is an optical path diagram of the zoom lens of Numerical Embodiment 1 focused on the closest object at the wide angle end.
Figure 17B:
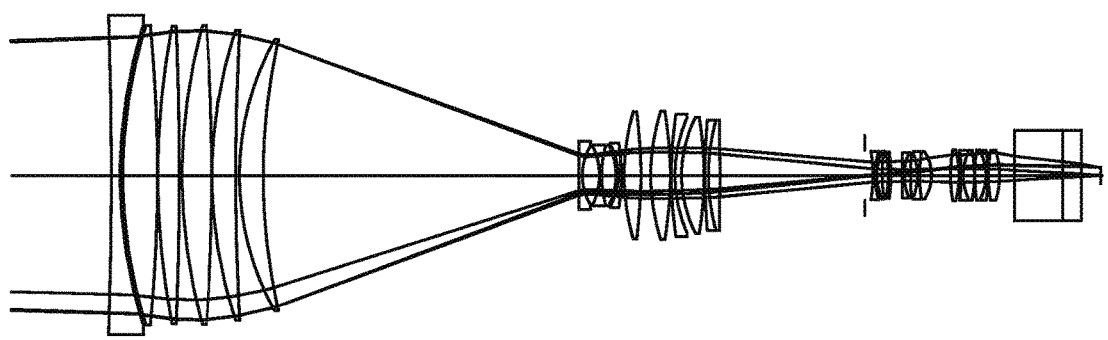
FIG. 17B is an optical path diagram of the zoom lens of Numerical Embodiment 1 focused on the closest object at the telephoto end.

The zoom lens of the present invention, as well as an image pickup apparatus having the same, includes, in order from the object side to the image side, a first lens unit having a positive refractive power, a second lens unit having a negative refractive power, and a rear lens group including at least one lens unit. The first lens unit is not configured to be moved for zooming. The second lens unit is configured to be move for zooming. The first lens unit includes at least six lenses, and the lens closest to the object side in the first lens unit is a 1n lens having a negative refractive power. The zoom lens satisfies the following conditional expressions:

$$-1.65 < f1n/f1 < -1.10, \text{ and} \quad (1)$$

$$37 < v1n < 48, \quad (2)$$

where f1n is the focal length of the 1n lens, v1n is the Abbe number for d-line of the 1n lens, and f1 is the focal length of the first lens unit. Optical effects achieved by the above configuration of the first lens unit of the present invention are described. First, the first lens unit of the present invention has the 1n lens having a negative refractive power at a position closest to the object side. FIGS. 17A and 17B are optical path diagrams of the zoom lens of Numerical Embodiment 1 focused on the closest object at the wide angle end and at the telephoto end, respectively. As can be seen in FIGS. 17A and 17B, the lens diameter of the 1n lens, which has the largest lens diameter, is determined by the off-axial rays passing when the zoom lens is focused on the closest object at the wide angle end. For this reason, widening the angle of view tends to increase the lens diameter of the 1n lens. Thus, in the present invention, the first lens unit has a negative lens placed closest to the object side, so that the entrance pupil of the zoom lens is shifted to the object side to prevent the lens diameter of the 1n lens from being increased by widening of the angle of view. Further, the present invention is characterized in that the first lens unit includes at least six lenses. As described above, the stronger the refractive power of the 1n lens, which is a negative lens, the more the entrance pupil is shifted to the object side, and the more advantageous it is for reduction of the lens diameter of the 1n lens. The stronger the refractive power of the 1n lens is, the stronger the refractive power of the positive lenses in the first lens unit becomes. Thus, when the first lens unit has at least six lenses, the refractive power of the first lens unit can be appropriately shared by the lenses in the first lens unit, which enables high optical performance to be achieved over the entire zoom range.

In addition, Expression (1) defines the ratio of the focal length of 1n lens, which is the lens closest to the object side in the first lens unit, to the focal length of the first lens unit. Expression (2) defines the Abbe number of the 1n lens, which is the lens closest to the object side in the first lens unit. The conditions in Expressions (1) and (2) are defined to favorably correct chromatic aberration at the telephoto end while allowing the zoom lens to achieve a wide angle of view, a high magnification, and reduction in size. If the upper limit of Expression (1) is not satisfied, a refractive power of the 1n lens is too strong relative to the first lens unit. Then, the high-order spherical aberration at the telephoto end increases, making it difficult to achieve favorable optical performance. Conversely, if the lower limit of Expression (1) is not satisfied, a refractive power of the 1n lens is too weak relative to the first lens unit. Then, the above-described size reduction effect for the 1n lens is not sufficiently produced, making it difficult to reduce the size of the zoom lens. Moreover, when the 1n lens has a weak refractive power, chromatic aberration caused by the positive lenses in the first lens unit cannot be corrected sufficiently, thus causing under-correction of the chromatic aberration at the telephoto end. If the upper limit of Expression (2) is not satisfied, the difference in Abbe number between the positive and negative lenses in the first lens unit is too small, making the refractive powers of the lenses in the first lens unit too strong. As a result, the high-order spherical aberration at the telephoto end increases, making it difficult to achieve favorable optical performance. Conversely, if the lower limit of Expression (2) is not satisfied, the difference in Abbe number between the positive and negative lenses in the first lens unit is too large, weakening the refractive power of the 1n lens. Then, chromatic aberration caused by the positive lenses in the first lens unit is not sufficiently corrected, thus causing under-correction of chromatic aberration at the telephoto end. It is more preferable when Expression (1) is set as follows:

$$-1.63 < f1n/f1 < -1.15. \tag{1a}$$

As another aspect, the zoom lens of the present invention is characterized in that the first lens unit consists of, in order from the object side to the image side, a 1-1 lens subunit configured not to be moved for focusing and a 1-2 lens subunit configured to be moved for focusing. When the first lens unit is thus provided with a lens unit configured to be moved for focusing, the distance by which the 1-2 lens subunit moves for focusing can be made constant over the entire zoom range.

As another aspect of the zoom lens of the present invention, the Abbe number of the positive lenses in the first lens unit is defined. Specifically, the zoom lens of the present invention satisfies the following conditional expression:

$$80 < \nu pave < 100, \tag{3}$$

where $\nu pave$ is the average of Abbe numbers for d-line of the positive lenses in the first lens unit. The condition in Expression (3) is defined in order to correct axial chromatic aberration at the telephoto end and to achieve high optical performance. If the upper limit of Expression (3) is not satisfied, it is difficult to produce a glass material with low dispersion. Conversely, if the lower limit of Expression (3) is not satisfied, the difference in Abbe number between the positive and negative lenses in the first lens unit is too small, making the refractive powers of the lenses in the first lens unit too strong. As a result, the high-order spherical aberration at the telephoto end increases, making it difficult to achieve favorable optical performance. It is more preferable when Expression (3) is set as follows:

$$87 < \nu pave < 97. \tag{3a}$$

As another aspect of the zoom lens of the present invention, the partial dispersion ratio of an optical material used in the first lens unit is defined. The zoom lens satisfies the following conditional expression:

$$-9.0 \times 10^{-4} < (\theta pave - \theta nave)/(\nu pave - \nu nave) < -3.0 \times 10^{-4}, \tag{4}$$

where $\nu pave$ is the average of the Abbe numbers for d-line of the positive lenses in the first lens unit, $\nu nave$ is the average of the Abbe numbers for d-line of the negative lenses in the first lens unit, $\theta pave$ is the average of the partial dispersion ratios of the positive lenses in the first lens unit, and $\theta nave$ is the average of the partial dispersion ratios of the negative lenses in the first lens unit.

The Abbe number and partial dispersion ratio of a material of an optical element (lens) used in the present invention are as follows. When Ng, NF, Nd, and NC are the indices of refraction at the Fraunhofer g-line (435.8 nm), the Fraunhofer F-line (486.1 nm), the Fraunhofer d-line (587.6 nm), and the Fraunhofer C-line (656.3 nm), respectively, the Abbe number $\nu d$ and the partial dispersion ratio $\theta gF$ for g-line and F-line are as follows:

$$\nu d = (Nd-1)/(NF-NC), \text{ and} \tag{a}$$

$$\theta gF = (Ng-NF)/(NF-NC). \tag{b}$$

Regarding existing optical materials, the partial dispersion ratio $\theta gF$ is within a narrow range relative to the Abbe number $\nu d$. Further, there is a tendency that the smaller the Abbe number $\nu d$, the larger the partial dispersion ratio $\theta gF$, and the larger the Abbe number $\nu d$, the lower the index of refraction. A condition for correcting chromatic aberration of a thin, closely-attached system consisting of two lenses 1 and 2 respectively having refractive powers $\varphi 1$, $\varphi 2$ and Abbe number $\nu 1$, $\nu 2$ and a refractive power $\varphi 1$ and an Abbe number $\nu 1$ is expressed as $$\varphi 1/\nu 1 + \varphi 2/\nu 2 = E. \tag{c}$$

The combined refractive power $\varphi$ of the lens 1 and the lens 2 is found by $$\varphi = \varphi 1 + \varphi 2. \tag{d}$$

When E=0 in Expression (c), the image formation position for C-line and the image formation for F-line coincide with respect to chromatic aberration. Then, $\varphi 1$ and $\varphi 2$ are expressed by the following expressions:

$$\varphi 1 = \varphi \times \nu 1/(\nu 1 - \nu 2), \text{ and} \tag{e}$$

$$\varphi 2 = \varphi \times \nu 2/(\nu 1 - \nu 2). \tag{f}$$

Figure 18:
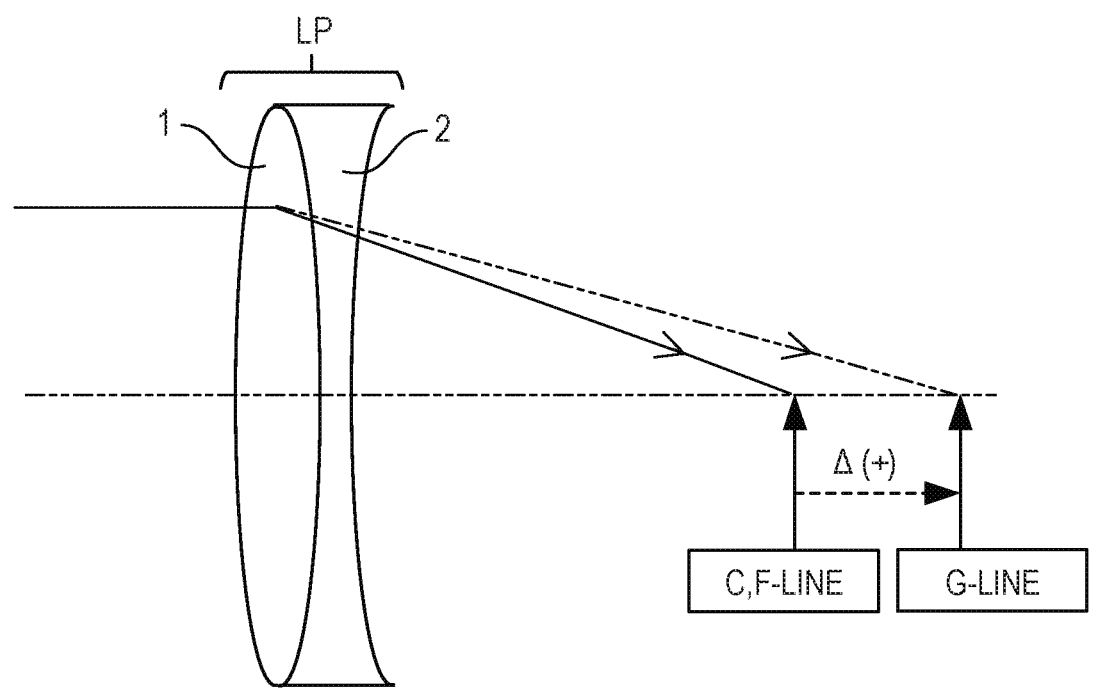
FIG. 18 is a schematic diagram regarding correction of axial chromatic aberration for two colors caused by a positive lens unit and a residual secondary spectrum.

FIG. 18 is a schematic diagram regarding correction of axial chromatic aberration for two colors caused by a lens unit LP having a positive refractive power and a residual secondary spectrum. In FIG. 18, a positive lens 1 is made of a material with a large Abbe number $\nu 1$, and a negative lens 2 is made of a material with a small Abbe number $\nu 2$. Thus, the positive lens 1 has a small partial dispersion ratio $\theta 1$, and the negative lens 2 has a large partial dispersion ratio $\theta 2$. Then, correction of axial chromatic aberration for C-line and F-line causes the image formation position for g-line to be shifted to the image side. When a secondary spectrum amount $\Delta S$ is the amount by which g-line axial chromatic aberration is shifted relative to C-line and F-line when rays are incident with the object distance being infinity, the secondary spectrum amount $\Delta S$ is expressed as $$\Delta S = -(1/\varphi) \times (\theta 1 - \theta 2)/(\nu 1 - \nu 2). \tag{g}$$

In order to favorably correct the secondary spectrum of axial chromatic aberration at the telephoto end, the amount of secondary spectrum caused by the first lens unit needs to be adjusted since it is the first lens unit that noticeably causes the secondary spectrum. The first lens unit has a positive refractive power, and in order to favorably correct the secondary spectrum of axial chromatic aberration at the telephoto end, a glass material selected for the first lens unit needs to be a material that causes only a small secondary spectrum amount ΔS.

The condition in Expression (4) is defined in order to correct axial chromatic aberration at the telephoto end and to achieve high optical performance. If the upper limit of Expression (4) is not satisfied, the secondary spectrum of axial chromatic aberration at the telephoto end is advantageously corrected, but the difference in Abbe number between the positive and negative lenses in the first lens unit is small, making the refractive powers of the lenses in the first lens unit strong. As a result, high-order spherical aberration at the telephoto end increases, making it difficult to achieve favorable optical performance. Conversely, if the lower limit of Expression (4) is not satisfied, the secondary spectrum of axial chromatic aberration at the telephoto end increases, making it difficult to favorably correct chromatic aberration at the telephoto end. It is more preferable when Expression (4) is set as follows:

$$-8.0\times10^{-4}<(\theta pave-\theta nave)/(\nu pave-\nu nave)<-3.5\times10^{-4}. \quad (4a)$$

As another aspect, the zoom lens of the present invention is characterized in that, the 1-1 lens subunit includes, in order from the object side to the image side, the 1n lens having a negative refractive power, a 2p lens having a positive refractive power, and a 3p lens having a positive refractive power. When the 1-1 lens subunit thus includes the negative lens on the object side and the positive lenses on the image side to form a retrofocus configuration, the entrance pupil of the zoom lens can be shifted to the object side while the image-side principal point of the first lens unit is shifted to the image side. Thus, such a configuration can advantageously reduce the size of the zoom lens by preventing the lens diameter of the 1-1 lens subunit from being increased by widening of the angle of view.

As another aspect, the zoom lens of the present invention is characterized in that the 1n lens is a biconcave lens. This makes it possible to set an appropriate refractive power for the 1n lens without making the radius of curvature of the 1n lens on the image side too small. When the radius of curvature of the 1n lens on the image side is small, the air interval between the 1n lens and the 2p lens becomes sensitive to the spherical aberration at the telephoto end, and hence, the zoom lens tends to be susceptible to manufacture error in lens thickness or the like.

As another aspect of the zoom lens of the present invention, the refractive powers of the lenses in the first lens unit are defined. The zoom lens satisfies the following conditional expressions:

$$-0.9<f1n/f2p<-0.3, \text{ and} \quad (5)$$

$$-0.80<f1n/f3p<-0.15, \quad (6)$$

where f1n, f2p, and f3p are the focal lengths of the 1n lens, the 2p lens, and the 3p lens, respectively. Expressions (5) and (6) are defined in order to reduce the size of the zoom lens and to achieve high optical performance at the telephoto end. If the upper limit of Expression (5) is not satisfied, the refractive power of the 2p lens is weak. Then, the radius of curvature of the 1n lens on the image side and the radius of curvature of the 2p lens on the object side increase, causing under-correction of the spherical aberration at the telephoto end. Conversely, if the lower limit of Expression (5) is not satisfied, a refractive power of the 1n lens is too weak relative to the 2p lens. Then, it is difficult to prevent the lens diameter of the 1n lens from being increased by widening of the angle of view. If the upper limit of Expression (6) is not satisfied, the refractive power of the 3p lens is weak, and consequently, the refractive power of the 2p lens is strong. Thus, the radius of curvature of the 1n lens on the image side and the radius of curvature of the 2p lens on the object side decrease, making it difficult to correct the high-order spherical aberration at the telephoto end. Conversely, if the lower limit of Expression (6) is not satisfied, a refractive power of the 1n lens is too weak relative to the 3p lens. Thus, it is difficult to prevent the lens diameter of the 1n lens from being increased by widening of the angle of view. It is more preferable when Expressions (5) and (6) are set as follows:

$$-0.8<f1n/f2p<-0.4, \text{ and} \quad (5a)$$

$$-0.60<f1n/f3p<-0.20. \quad (6a)$$

As another aspect of the zoom lens of the present invention, the ratio of the focal length of the zoom lens at the telephoto end to the focal length of the first lens unit is defined. The zoom lens satisfies the following conditional expression:

$$2.0<ft/f1<6.0, \quad (7)$$

where f1 is the focal length of the first lens unit, and ft is the focal length of the zoom lens at the telephoto end. The condition in Expression (7) is defined in order to favorably correct axial chromatic aberration while achieving a high magnification. If the upper limit of Expression (7) is not satisfied, the size of the zoom lens is advantageously reduced, but it is difficult to achieve high performance at the telephoto end and to favorably correct axial chromatic aberration in particular. Conversely, if the lower limit of Expression (7) is not satisfied, the focal length of the first lens unit increases, making it difficult to achieve a high magnification and size reduction of the zoom lens at the same time. It is more preferable when Expression (7) is set as follows:

$$2.3<ft/f1<5.0. \quad (7a)$$

Further, the image pickup apparatus of the present invention includes a zoom lens of any of the embodiments and a solid-state image pickup element having a predetermined effective image pickup range to receive an image formed by the zoom lens.

Note that a protective filter or a lens equivalent to a protective filter may be attached to the first lens unit of the present invention at a position closest to the object side. If a protective filter or a lens equivalent to a protective filter satisfies the following conditional expression $$|f1/ff|<1.0\times10^{-4} \quad (8)$$

where ff is the focal length of the protective filter or the lens equivalent to the protective filter, the protective filter or lens equivalent thereto is not included in the first lens unit.

Specific configurations of the zoom lens of the present invention are described below by reciting the characteristics of the lens configurations of Numerical Embodiments 1 to 8 corresponding to Embodiments 1 to 8.

Embodiment 1

Figure 1:
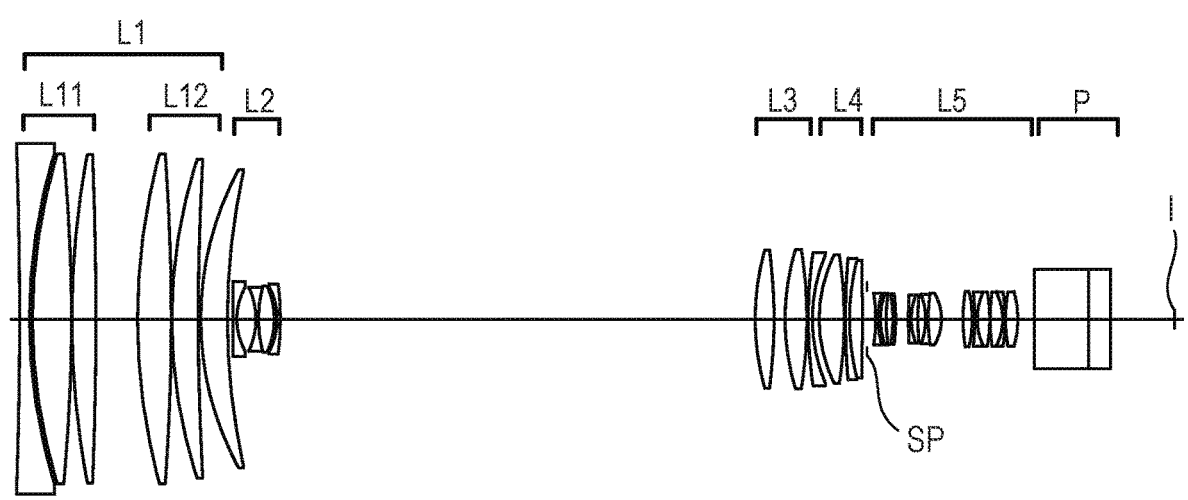
FIG. 1 is a lens sectional diagram of a zoom lens of Numerical Embodiment 1 focused at infinity at the wide angle end.
Figure 2A:
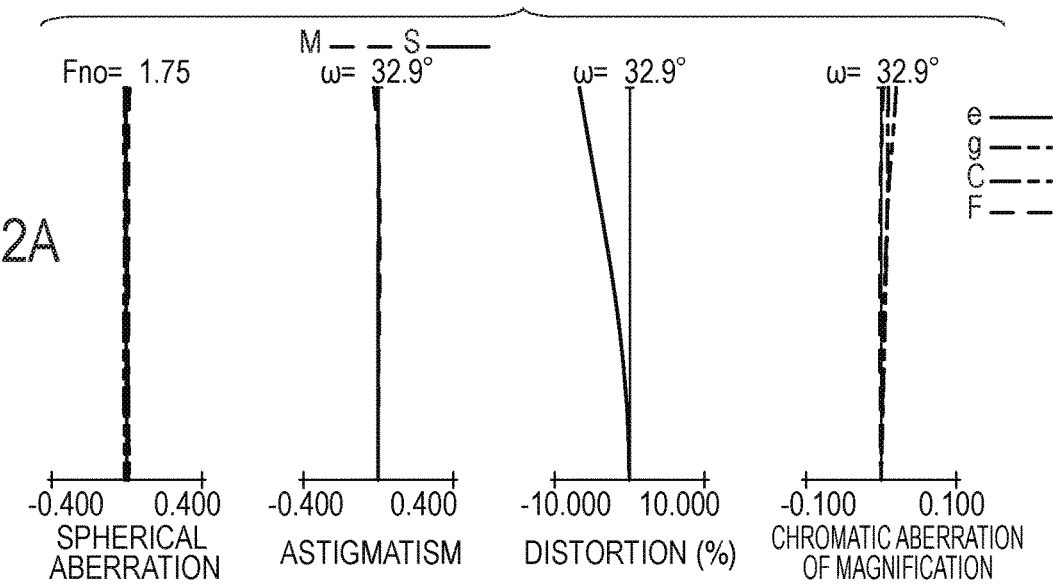
FIG. 2A is an aberration diagram of the zoom lens of Numerical Embodiment 1 focused at infinity at the wide angle end.
Figure 2B:
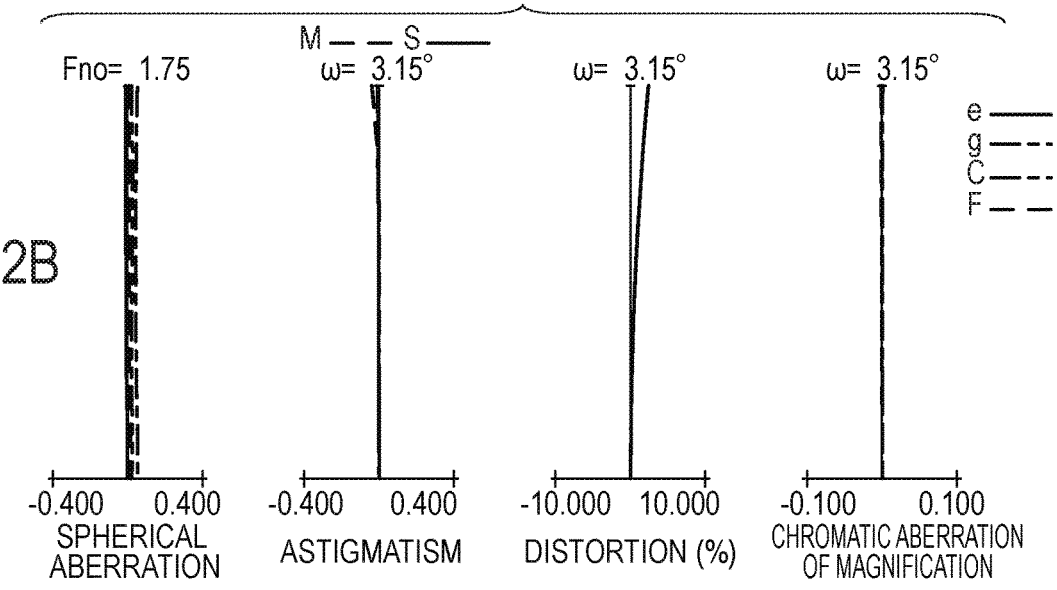
FIG. 2B is an aberration diagram of the zoom lens of Numerical Embodiment 1 focused at infinity at f=100 mm.
Figure 2C:
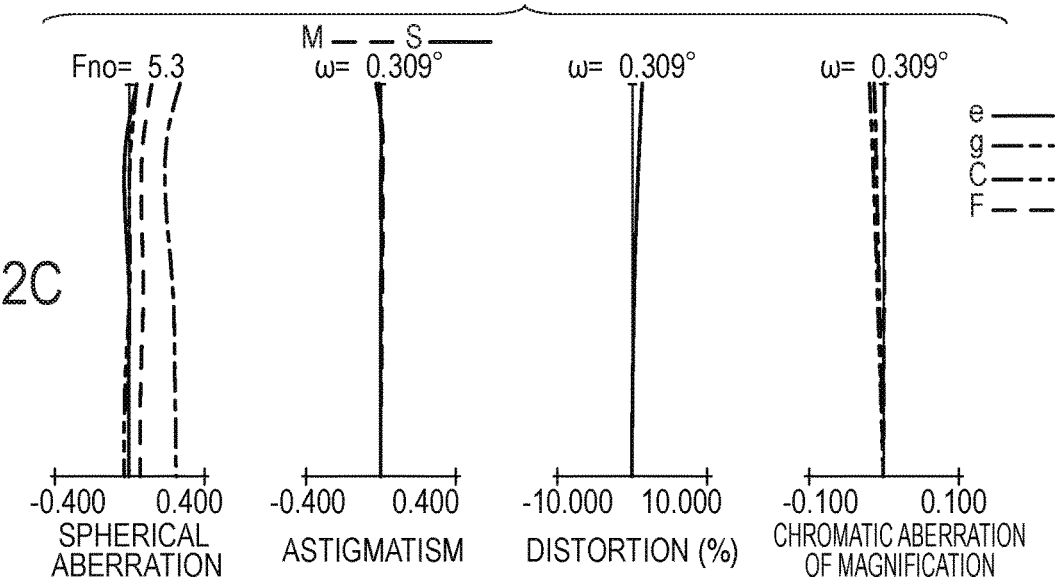
FIG. 2C is an aberration diagram of the zoom lens of Numerical Embodiment 1 focused at infinity at the telephoto end.

FIG. 1 is a lens sectional diagram of a zoom lens according to Embodiment 1 (Numerical Embodiment 1) of the present invention focused at infinity at the wide angle of view. FIGS. 2A, 2B, and 2C illustrate longitudinal aberration diagrams of the zoom lens focused at infinity at the wide angle end, at a focal length of 100 mm, and at the telephoto end, respectively. The focal lengths are values in the numerical embodiment to be described later expressed in millimeters. The same is true to the following numerical embodiments.

The zoom lens in FIG. 1 includes, in order from the object side, a first lens unit L1 having a positive refractive power configured to be moved for focusing, a second lens unit L2 having a negative refractive power configured to be moved to the image side for zooming from the wide angle end to the telephoto end, a third lens unit L3 having a positive refractive power configured to be moved to the object side for zooming from the wide angle end to the telephoto end, a fourth lens unit L4 having a positive refractive power configured to be moved non-linearly on the optical axis in conjunction with the movement of the second lens unit L2 and the third lens unit L3 in order to correct image plane variation caused by zooming, and a fifth lens unit L5 for image formation configured not to be moved for zooming. In this embodiment, the rear lens group corresponds to the third lens unit L3 to the fifth lens unit L5.

In this embodiment, the second lens unit L2, the third lens unit L3, and the fourth lens unit L4 form the zooming system. "SP" denotes an aperture stop, which is disposed between the fourth lens unit L4 and the fifth lens unit L5 and configured not to be moved in the optical-axis direction for zooming. "P" denotes a glass block representing a color separation prism or an optical filter. "I" denotes an image plane. When the zoom lens is used as an image pickup optical system for a broadcasting television camera, a video camera, or a digital still camera, the image plane I corresponds to the imaging plane of a solid-state image pickup element (a photo-electric conversion element) or the like that receives an optical image formed by the zoom lens and performs photo-electric conversion. When the zoom lens is used as an image pickup optical system for a film camera, the image plane I corresponds to a film plane that is sensitive to an optical image formed by the zoom lens.

In the section for spherical aberration in each longitudinal aberration diagram, the solid line, the dot-dot-dash line, the dot-dash line, and the broken line denote the e-line, the g-line, the C-line, and the F-line, respectively. In the section for astigmatism, the broken line and the solid line denote the meridional image plane and the sagittal image plane, respectively. In the section for chromatic aberration of magnification, the dot-dot-dash line, the dot-dash line, and the broken line denote the g-line, the C-line, and the F-line, respectively. Further, "ω" denotes a half angle of view, and "Fno" denotes an f-number. In each longitudinal aberration diagram, spherical aberration is depicted on a scale of ±0.4 mm; astigmatism, on a scale of ±0.4 mm; distortion, on a scale of ±10%; and chromatic aberration of magnification, on a scale of ±0.1 mm. Note that in the following embodiments, the wide angle end and the telephoto end refer to zoom positions which are available ends of the zoom range in which the second lens unit L2 for zooming can move on the optical axis mechanically.

The first lens unit L1 corresponds to the 1st to 12th surfaces. The second lens unit L2 corresponds to the 13th to 19th surfaces, the third lens unit L3 corresponds to the 20th to 25th surfaces, and the fourth lens unit L4 corresponds to the 26th to 30th surfaces. The fifth lens unit L5 corresponds to the 31st to 53rd surfaces. The first lens unit L1 consists of a 1-1 lens subunit L11 configured not to be moved for focusing and a 1-2 lens subunit L12 having a positive refractive power configured to be moved for focusing from infinity to close-up. The 1-1 lens subunit L11 corresponds to the 1st to 6th surfaces, and the 1-2 lens subunit L12 corresponds to the 7th to 12th surfaces. The first lens unit L1 consists of six lenses which are, in order from the object side, a biconcave lens, a biconvex lens, a biconvex lens, a biconvex lens, a meniscus convex lens having a concave surface facing the image side, and a meniscus convex lens having a concave surface facing the image side.

Numerical Embodiment 1 corresponding to Embodiment 1 above is described. Not only in Numerical Embodiment 1 but also in the following embodiments, "i" indicates the ordinal number of a surface (optical surface) from the object side; "ri", the radius of curvature of the i-th surface from the object side; "di", the distance (on the optical axis) between the i-th surface and the (i+1)-th surface from the object side; "ndi", "vdi", and "θgFi", the refractive index, the Abbe number, and the partial dispersion ratio, respectively, of a medium (optical member) between the i-th surface and the (i+1)-th surface from the object side; and "BF", a back focal length in air. With an X axis being the optical-axis direction, an H axis being perpendicular to the optical axis, a light travelling direction being positive, "R" being a paraxial radius of curvature, "k" being a conic constant, and "A3" to "A16" each being an aspherical coefficient, an aspherical shape is expressed as follows. Note that "E-Z" in aspherical surface data indicates "×10$^{-Z}$".

$$X = \frac{H^2/R}{1 + \sqrt{1-(1+k)(H/R)^2}} + A4H^4 + A6H^6 +$$
$$A8H^8 + A10H^{10} + A12H^{12} + A14H^{14} + A16H^{16} + A3H^3 +$$
$$A5H^5 + A7H^7 + A9H^9 + A11H^{11} + A13H^{13} + A15H^{15}$$

Table 1 shows values corresponding to the conditional expressions of Embodiment 1. Embodiment 1 satisfies Expressions (1) to (7) to appropriately set the lens configuration, refractive power, and glass material of the first lens unit. Thereby, the zoom lens of Embodiment 1 achieves a wide angle of view, a high zoom ratio, reduction in size and weight, and high optical performance over the entire zoom range. It should be noted that the zoom lens of the present invention has to satisfy Expressions (1) and (2), but does not necessarily have to satisfy Expressions (3) to (7). However, better effects can be produced when at least one of Expressions (3) to (7) is additionally satisfied. This is true to the other embodiments as well.

Figure 19:
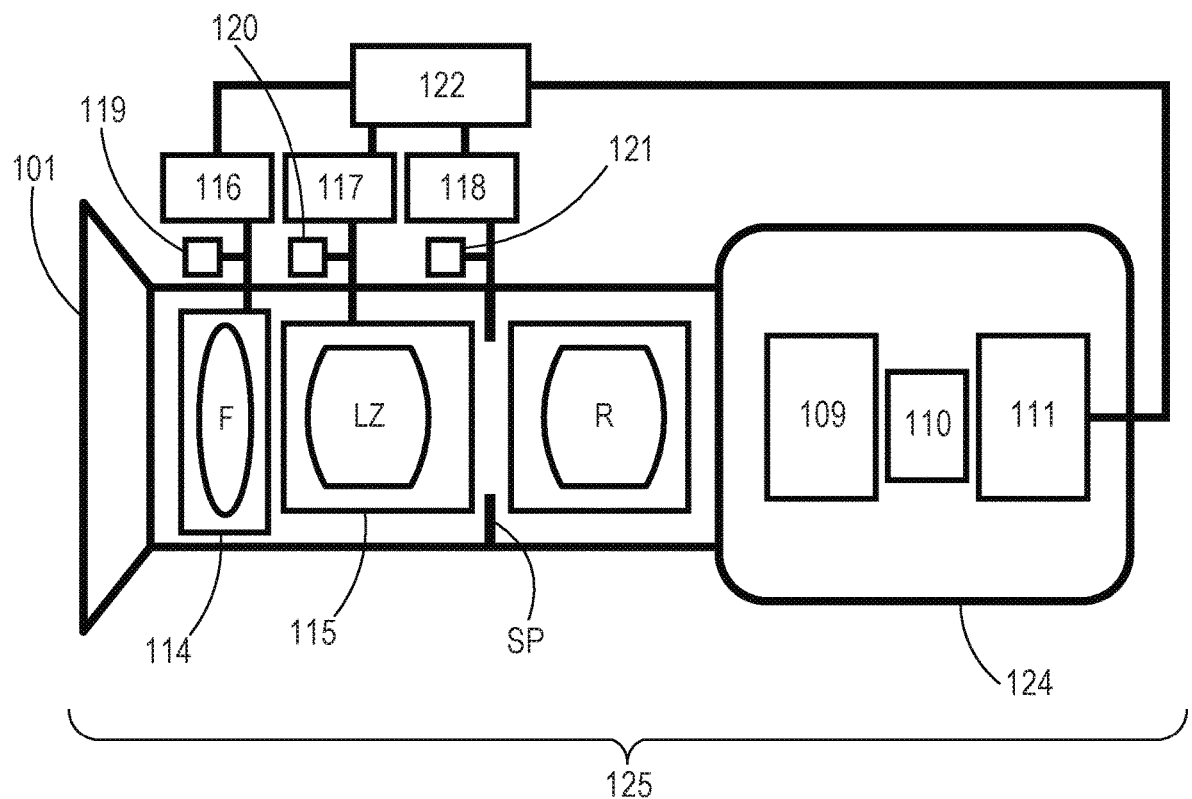
FIG. 19 is a schematic diagram of a main part of an image pickup apparatus of the present invention.

FIG. 19 is a schematic diagram illustrating an image pickup apparatus (television camera system) using the zoom lens of any of the embodiments as its imaging optical system. In FIG. 19, reference numeral 101 denotes the zoom lens of any one of Embodiments 1 to 8; 124, a camera to and from which the zoom lens 101 is attachable and detachable; and 125, an image pickup apparatus formed by attachment of the zoom lens 101 to the camera 124. The zoom lens 101 has a first lens unit F, a zooming part LZ, and a rear lens group R for image formation. The first lens unit F includes a lens unit for focusing. The zooming part LZ includes second and third lens units configured to be moved on the optical axis for zooming and a fourth lens unit configured to be moved on the optical axis in order to correct image plane variation caused by zooming. "SP" denotes an aperture stop. "114" and "115" are driving mechanisms, such as a helicoid or a cam, to drive the first lens unit F and the zooming part LZ, respectively, in the optical-axis direction. "116" to "118" are motors (driving means) to electrically drive the driving mechanism 114, the driving mechanism 115, and the aperture stop SP, respectively. "119" to "121" are detectors, such as an encoder, a potentiometer, or a photosensor, to detect the positions of the first lens unit F and the zooming part LZ on the optical axis and the aperture diameter of the aperture stop SP. In the camera 124, "109" denotes a glass block equivalent to an optical filter or a color separation optical system in the camera 124, and "110" denotes a solid-state image pickup element (photo-electric conversion element) such as a CCD or CMOS sensor to receive a subject image formed by the zoom lens 101. Further, "111" and "122" are CPUs to control the driving of various parts of the camera 124 and the zoom lens 101.

An image pickup apparatus offering high optical performance can be obtained when the zoom lens of the present invention is thus applied to a television camera.

Embodiment 2

Figure 3:
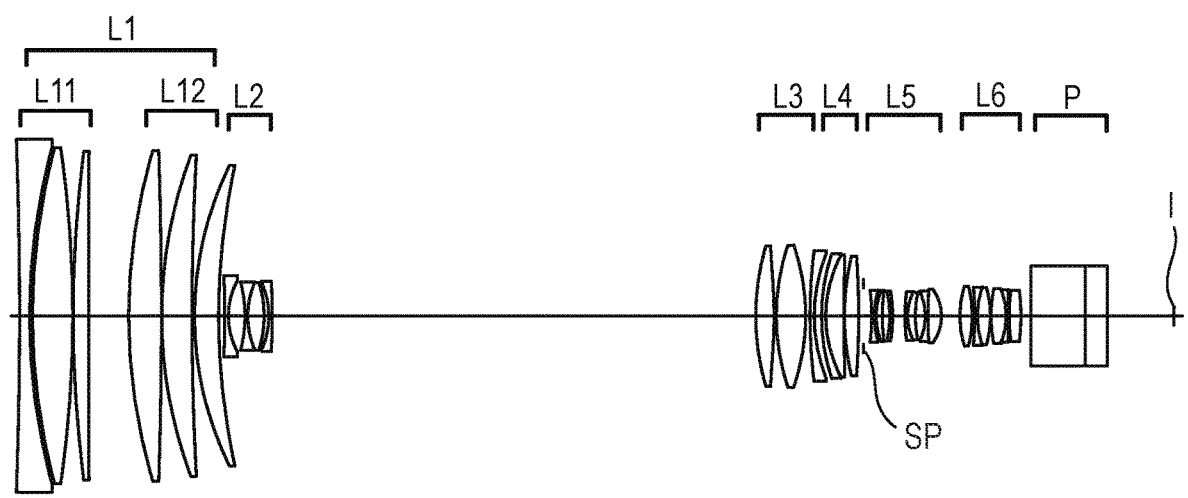
FIG. 3 is a lens sectional diagram of a zoom lens of Numerical Embodiment 2 focused at infinity at the wide angle end.
Figure 4A:
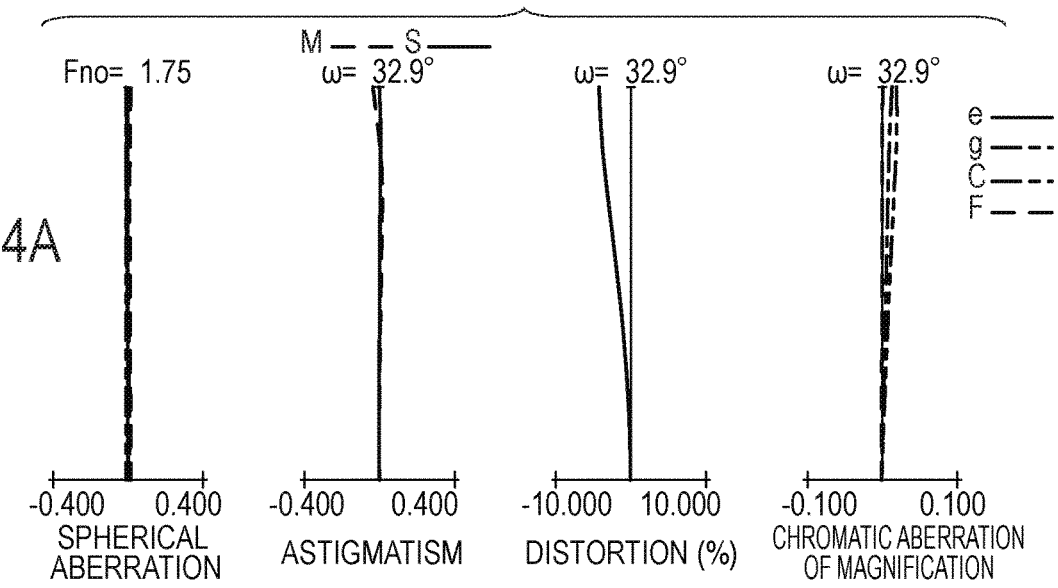
FIG. 4A is an aberration diagram of the zoom lens of Numerical Embodiment 2 focused at infinity at the wide angle end.
Figure 4B:
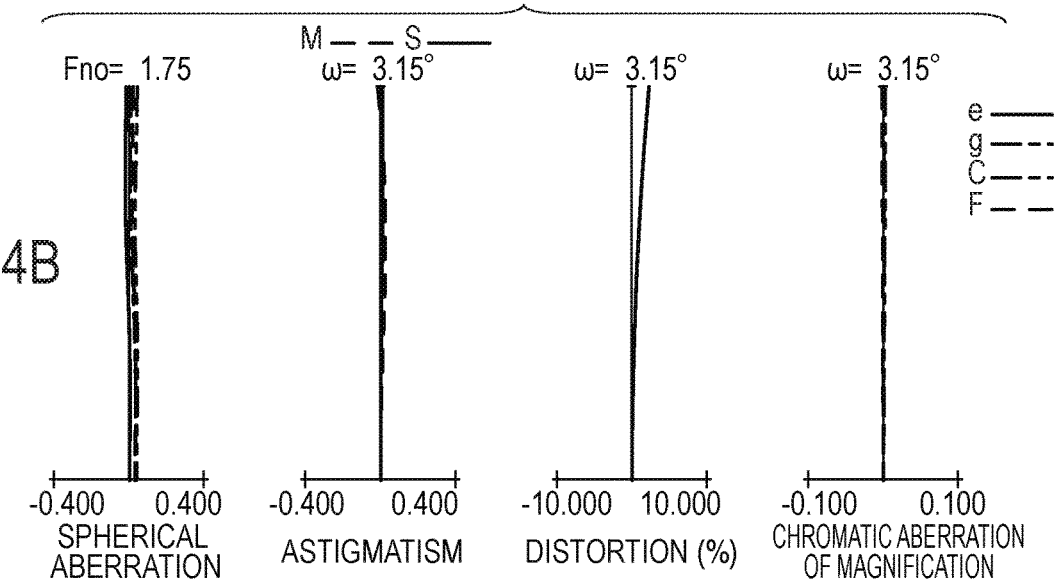
FIG. 4B is an aberration diagram of the zoom lens of Numerical Embodiment 2 focused at infinity at f=100 mm.
Figure 4C:
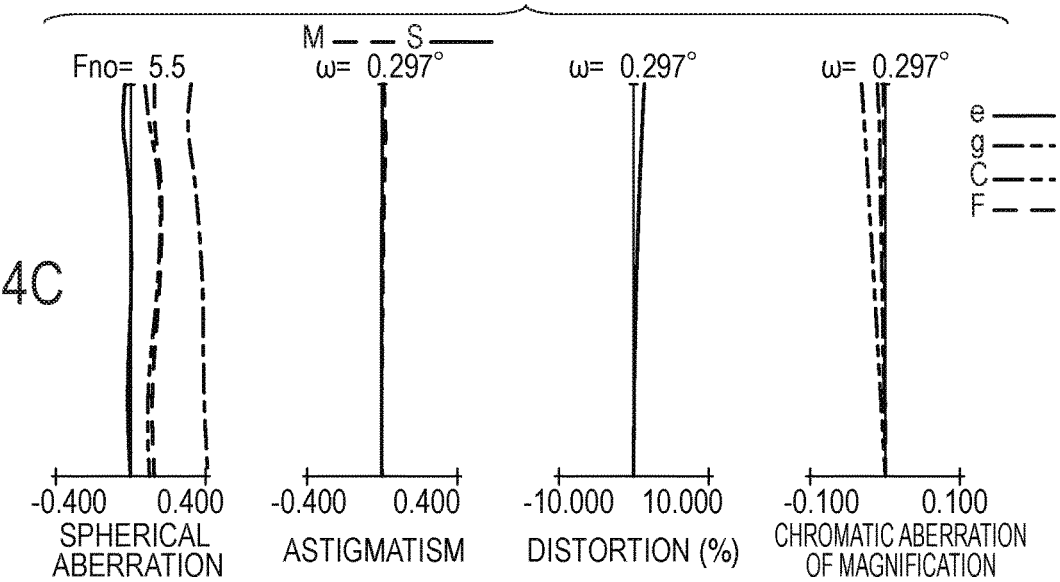
FIG. 4C is an aberration diagram of the zoom lens of Numerical Embodiment 2 focused at infinity at the telephoto end.

FIG. 3 is a lens sectional diagram of a zoom lens according to Embodiment 2 (Numerical Embodiment 2) of the present invention focused at infinity at the wide angle of view. FIGS. 4A, 4B, and 4C illustrate longitudinal aberration diagrams of the zoom lens focused at infinity at the wide angle end, at a focal length of 100 mm, and at the telephoto end, respectively.

The zoom lens in FIG. 3 includes, in order from the object side, a first lens unit L1 having a positive refractive power configured to be moved for focusing, a second lens unit L2 having a negative refractive power configured to be moved to the image side for zooming from the wide angle end to the telephoto end, a third lens unit L3 having a positive refractive power configured to be moved to the object side for zooming from the wide angle end to the telephoto end, a fourth lens unit L4 having a positive refractive power configured to be moved non-linearly on the optical axis in conjunction with the movement of the second lens unit L2 and the third lens unit L3 in order to correct image plane variation caused by zooming, a fifth lens unit L5 configured not to be moved for zooming, and a sixth lens unit L6 having a positive refractive power configured to be moved slightly for zooming to correct defocus caused by manufacture error. In this embodiment, the rear lens group corresponds to the third lens unit L3 to the sixth lens unit L6.

In this embodiment, the second lens unit L2, the third lens unit L3, and the fourth lens unit L4 form the zooming system. "SP" denotes an aperture stop, which is disposed between the fourth lens unit L4 and the fifth lens unit L5 and configured not to be moved in the optical-axis direction for zooming.

The first lens unit L1 corresponds to the 1st to 12th surfaces. The second lens unit L2 corresponds to the 13th to 19th surfaces, the third lens unit L3 corresponds to the 20th to 25th surfaces, and the fourth lens unit L4 corresponds to the 26th to 30th surfaces. The fifth lens unit L5 corresponds to the 31st to 43rd surfaces, and the sixth lens unit L6 corresponds to the 44th to 53rd surfaces. The first lens unit L1 consists of a 1-1 lens subunit L11 configured not to be moved for focusing and a 1-2 lens subunit L12 having a positive refractive power configured to be moved for focusing from infinity to close-up. The 1-1 lens subunit L11 corresponds to the 1st to 6th surfaces, and the 1-2 lens subunit L12 corresponds to the 7th to 12th surfaces. The first lens unit L1 consists of six lenses which are, in order from the object side, a biconcave lens, a biconvex lens, a meniscus convex lens having a concave surface facing the image side, a biconvex lens, a meniscus convex lens having a concave surface facing the image side, and a meniscus convex lens having a concave surface facing the image side.

Table 1 shows values corresponding to the conditional expressions of Embodiment 2. Embodiment 2 satisfies Expressions (1) to (7) to appropriately set the lens configuration, refractive power, and glass material of the first lens unit. Thereby, the zoom lens achieves a wide angle of view, a high zoom ratio, reduction in size and weight, and high optical performance over the entire zoom range.

Embodiment 3

Figure 5:
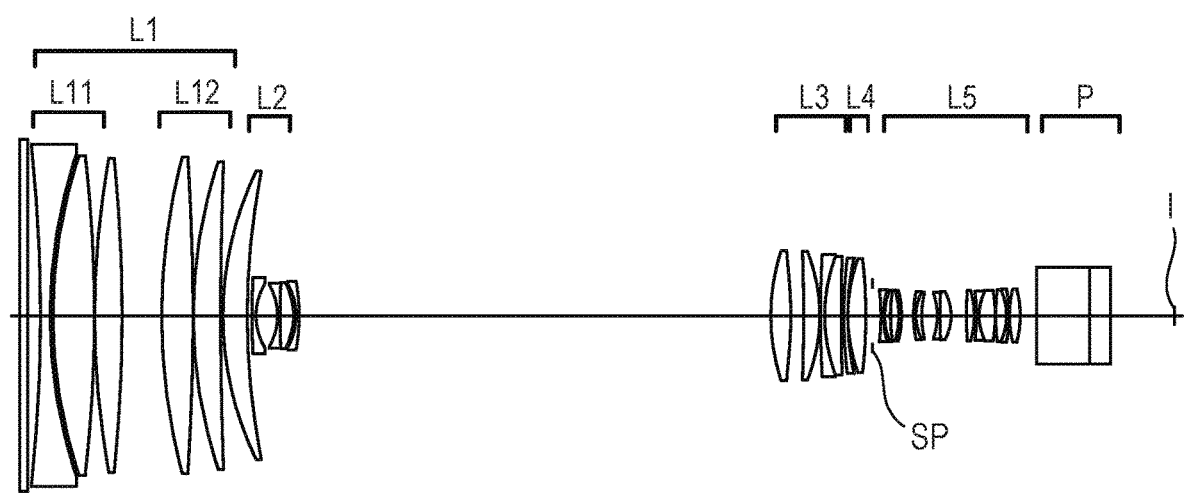
FIG. 5 is a lens sectional diagram of a zoom lens of Numerical Embodiment 3 focused at infinity at the wide angle end.
Figure 6A:
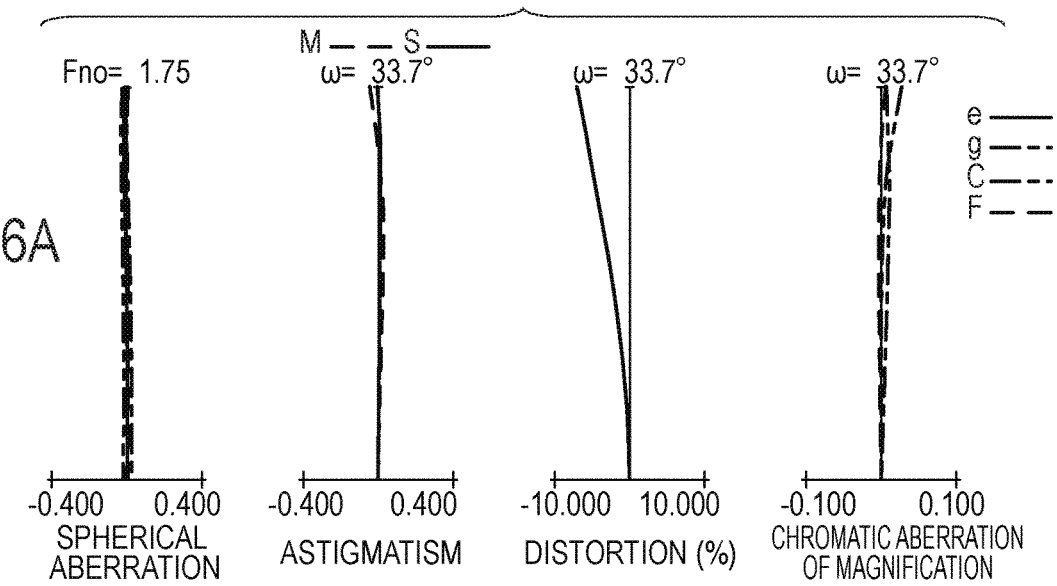
FIG. 6A is an aberration diagram of the zoom lens of Numerical Embodiment 3 focused at infinity at the wide angle end.
Figure 6B:
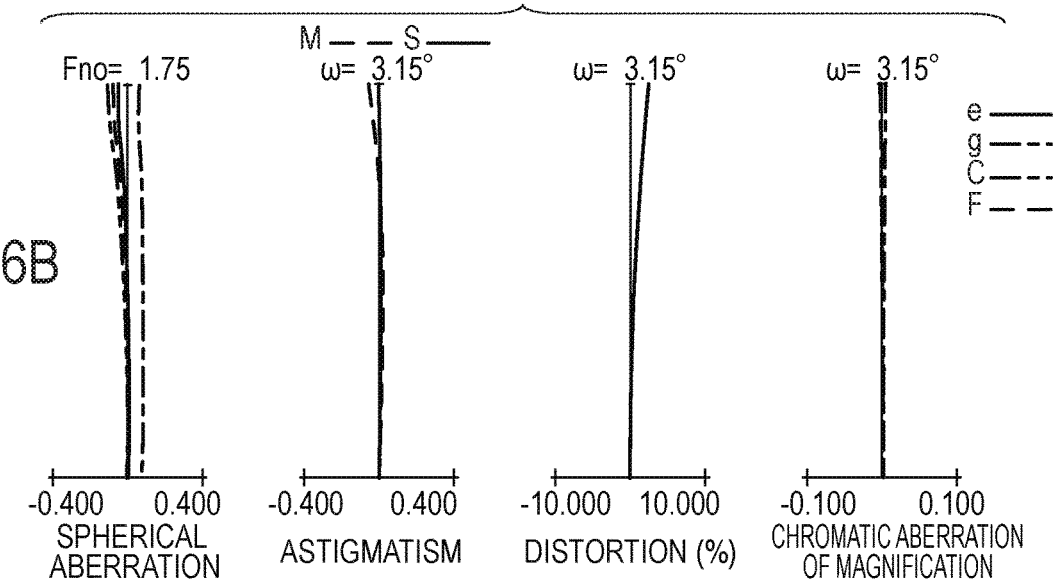
FIG. 6B is an aberration diagram of the zoom lens of Numerical Embodiment 3 focused at infinity at f=100 mm.
Figure 6C:
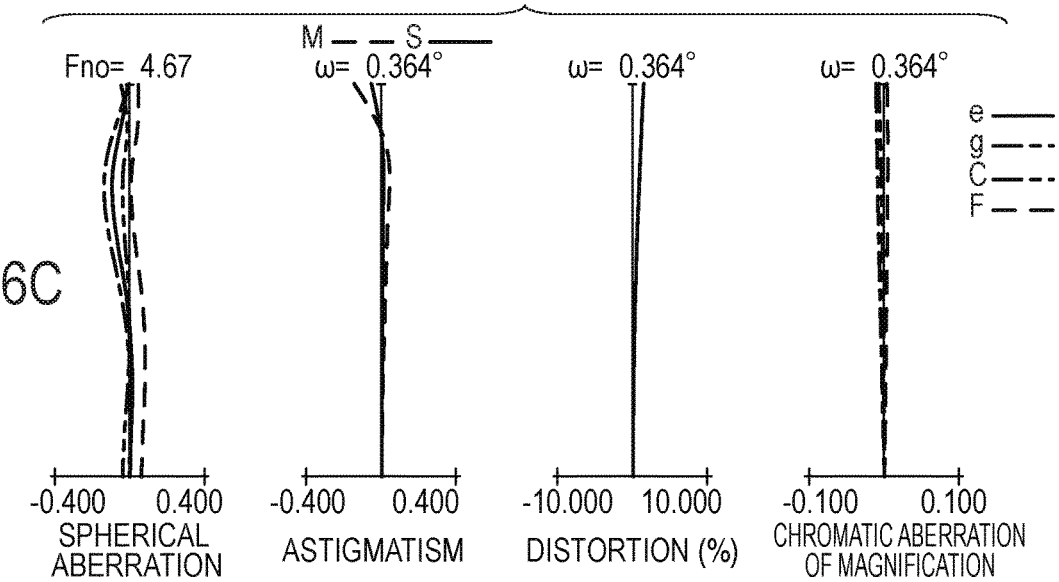
FIG. 6C is an aberration diagram of the zoom lens of Numerical Embodiment 3 focused at infinity at the telephoto end.

FIG. 5 is a lens sectional diagram of a zoom lens according to Embodiment 3 (Numerical Embodiment 3) of the present invention focused at infinity at the wide angle of view. FIGS. 6A, 6B, and 6C illustrate longitudinal aberration diagrams of the zoom lens focused at infinity at the wide angle end, at a focal length of 100 mm, and at the telephoto end, respectively.

The zoom lens in FIG. 5 includes, in order from the object side, a protective filter F, a first lens unit L1 having a positive refractive power configured to be moved for focusing, a second lens unit L2 having a negative refractive power configured to be moved to the image side for zooming from the wide angle end to the telephoto end, a third lens unit L3 having a positive refractive power configured to be moved to the object side for zooming from the wide angle end to the telephoto end, a fourth lens unit L4 having a positive refractive power configured to be moved non-linearly on the optical axis in conjunction with the movement of the second lens unit L2 and the third lens unit L3 in order to correct image plane variation caused by zooming, and a fifth lens unit L5 configured not to be moved for zooming. In this embodiment, the rear lens group corresponds to the third lens unit L3 to the fifth lens unit L5.

In this embodiment, the second lens unit L2, the third lens unit L3, and the fourth lens unit L4 form the zooming system. "SP" denotes an aperture stop, which is disposed between the fourth lens unit L4 and the fifth lens unit L5 and configured not to be moved in the optical-axis direction for zooming.

The first lens unit L1 corresponds to the 3rd to 14th surfaces. The second lens unit L2 corresponds to the 15th to 21st surfaces, the third lens unit L3 corresponds to the 22nd to 28th surfaces, and the fourth lens unit L4 corresponds to the 29th to 32nd surfaces. The fifth lens unit L5 corresponds to the 34th to 55th surfaces. The first lens unit L1 consists of a 1-1 lens subunit L11 configured not to be moved for focusing and a 1-2 lens subunit L12 having a positive refractive power configured to be moved for focusing from infinity to close-up. The 1-1 lens subunit L11 corresponds to the 3rd to 8th surfaces, and the 1-2 lens subunit L12 corresponds to the 9th to 14th surfaces. The first lens unit L1 consists of six lenses which are, in order from the object side, a biconcave lens, a biconvex lens, a biconvex lens, a biconvex lens, a meniscus convex lens having a concave surface facing the image side, and a meniscus convex lens having a concave surface facing the image side.

Table 1 shows values corresponding to the conditional expressions of Embodiment 3. Embodiment 3 satisfies Expressions (1) to (7) to appropriately set the lens configuration, refractive power, and glass material of the first lens unit. Thereby, the zoom lens achieves a wide angle of view, a high zoom ratio, reduction in size and weight, and high optical performance over the entire zoom range.

Embodiment 4

Figure 7:
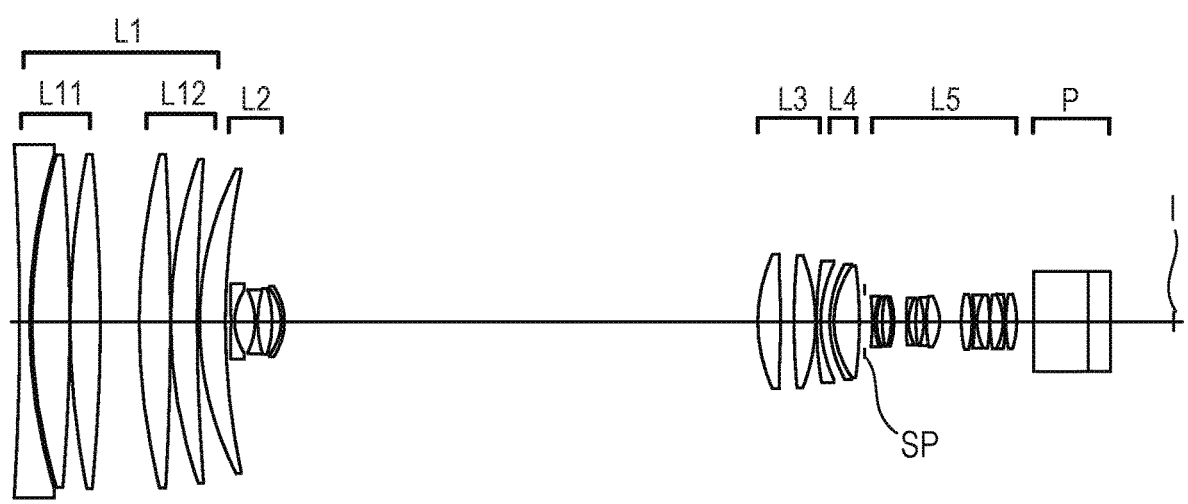
FIG. 7 is a lens sectional diagram of a zoom lens of Numerical Embodiment 4 focused at infinity at the wide angle end.
Figure 8A:
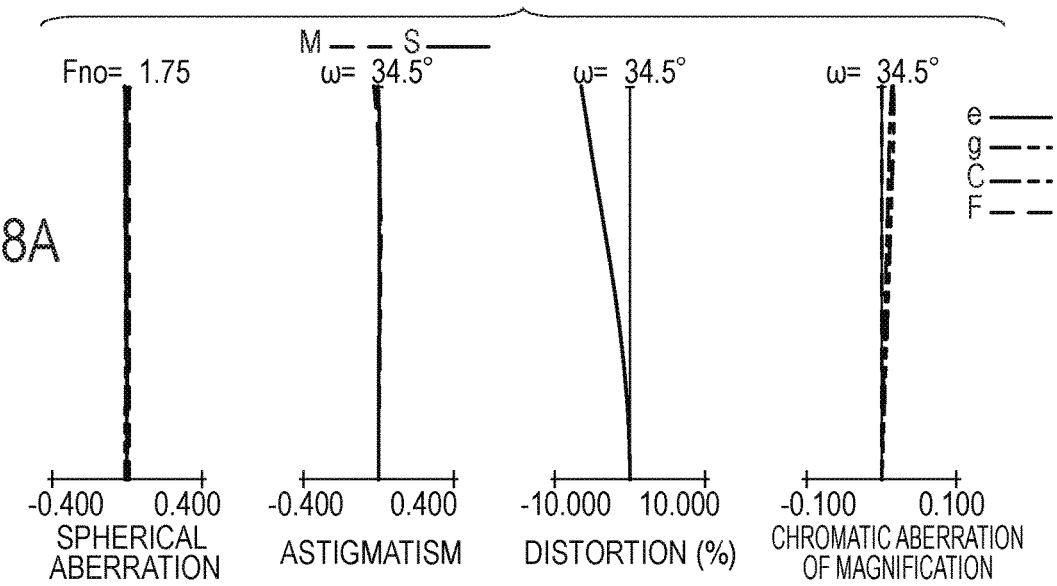
FIG. 8A is an aberration diagram of the zoom lens of Numerical Embodiment 4 focused at infinity at the wide angle end.
Figure 8B:
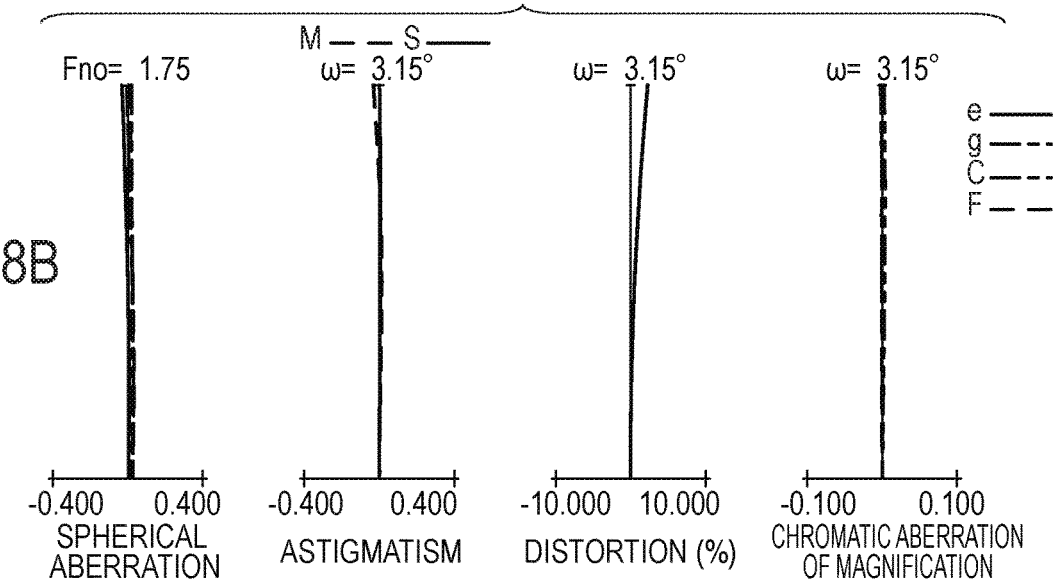
FIG. 8B is an aberration diagram of the zoom lens of Numerical Embodiment 4 focused at infinity at f=100 mm.
Figure 8C:
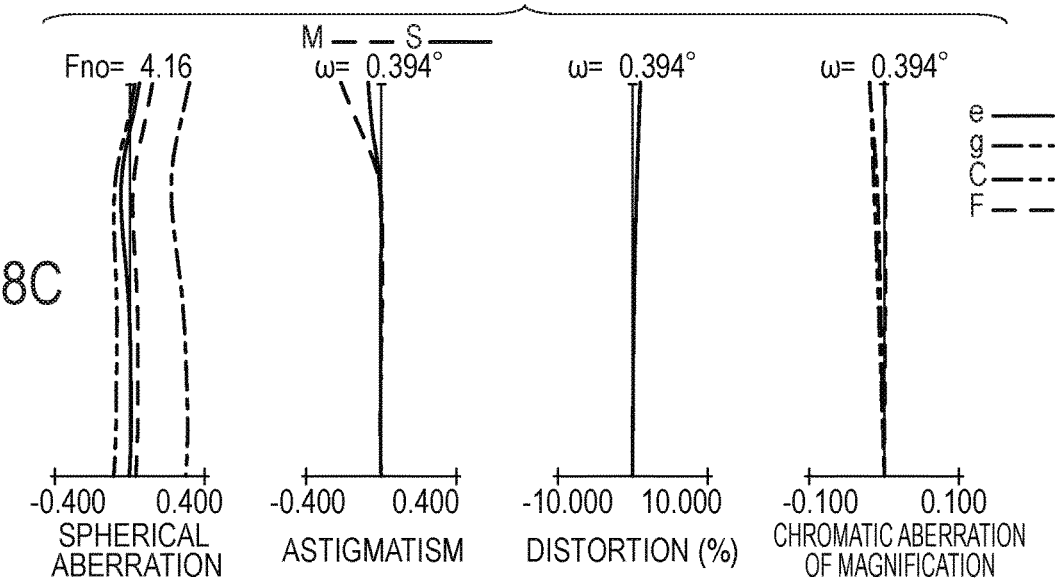
FIG. 8C is an aberration diagram of the zoom lens of Numerical Embodiment 4 focused at infinity at the telephoto end.

FIG. 7 is a lens sectional diagram of a zoom lens according to Embodiment 4 (Numerical Embodiment 4) of the present invention focused at infinity at the wide angle of view. FIGS. 8A, 8B, and 8C illustrate longitudinal aberration diagrams of the zoom lens focused at infinity at the wide angle end, at a focal length of 100 mm, and at the telephoto end, respectively.

The zoom lens in FIG. 7 includes, in order from the object side, a first lens unit L1 for focusing having a positive refractive power, a second lens unit L2 having a negative refractive power configured to be moved to the image side for zooming from the wide angle end to the telephoto end, a third lens unit L3 having a positive refractive power configured to be moved to the object side for zooming from the wide angle end to the telephoto end, a fourth lens unit L4 having a positive refractive power configured to be moved non-linearly on the optical axis in conjunction with the movement of the second lens unit L2 and the third lens unit L3 in order to correct image plane variation caused by zooming, and a fifth lens unit L5 configured not to be moved for zooming. In this embodiment, the rear lens group corresponds to the third lens unit L3 to the fifth lens unit L5.

In this embodiment, the second lens unit L2, the third lens unit L3, and the fourth lens unit L4 form the zooming system. "SP" denotes an aperture stop, which is disposed between the fourth lens unit L4 and the fifth lens unit L5 and configured not to be moved in the optical-axis direction for zooming.

The first lens unit L1 corresponds to the 1st to 12th surfaces. The second lens unit L2 corresponds to the 13th to 19th surfaces, the third lens unit L3 corresponds to the 20th to 25th surfaces, and the fourth lens unit L4 corresponds to the 26th to 28th surfaces. The fifth lens unit L5 corresponds to the 30th to 51st surfaces. The first lens unit L1 consists of a 1-1 lens subunit L11 configured not to be moved for focusing and a 1-2 lens subunit L12 having a positive refractive power configured to be moved for focusing from infinity to close-up. The 1-1 lens subunit L11 corresponds to the 1st to 6th surfaces, and the 1-2 lens subunit L12 corresponds to the 7th to 12th surfaces. The first lens unit L1 consists of six lenses which are, in order from the object side, a biconcave lens, a biconvex lens, a biconvex lens, a biconvex lens, a meniscus convex lens having a concave surface facing the image side, and a meniscus convex lens having a concave surface facing the image side.

Table 1 shows values corresponding to the conditional expressions of Embodiment 4. Embodiment 4 satisfies Expressions (1) to (7) to appropriately set the lens configuration, refractive power, and glass material of the first lens unit. Thereby, the zoom lens achieves a wide angle of view, a high zoom ratio, reduction in size and weight, and high optical performance over the entire zoom range.

Embodiment 5

Figure 9:
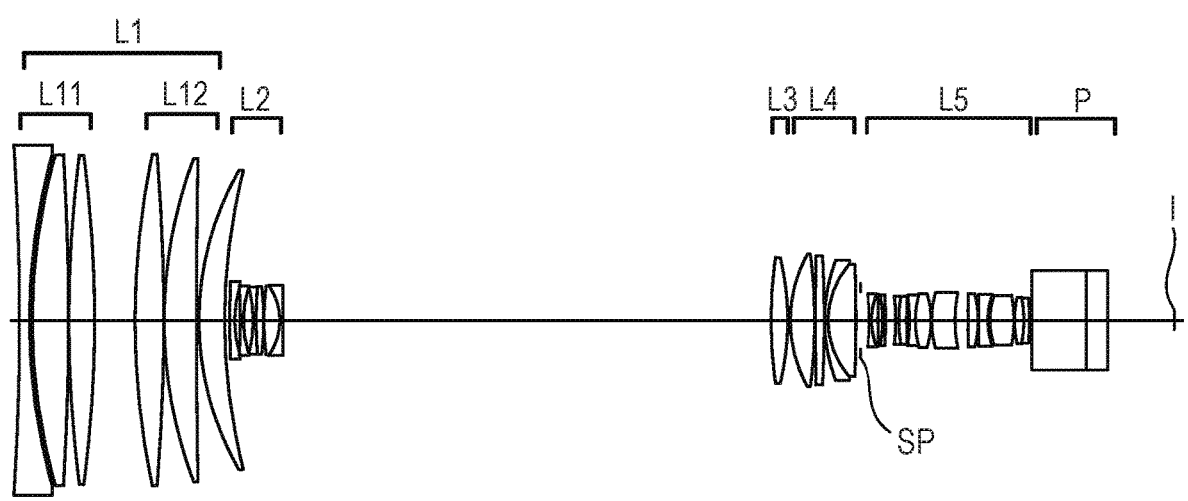
FIG. 9 is a lens sectional diagram of a zoom lens of Numerical Embodiment 5 focused at infinity at the wide angle end.
Figure 10A:
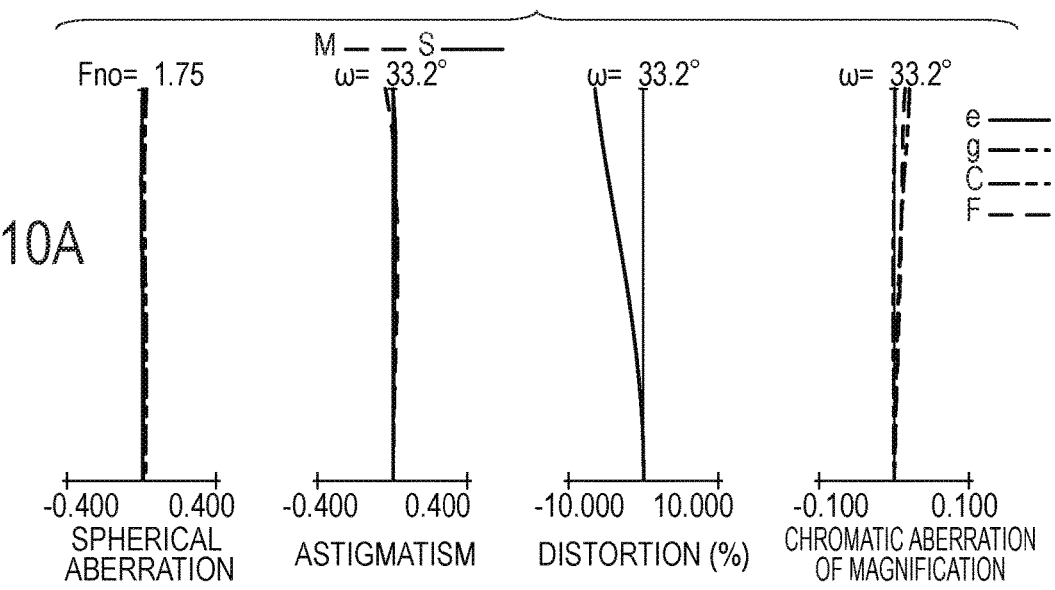
FIG. 10A is an aberration diagram of the zoom lens of Numerical Embodiment 5 focused at infinity at the wide angle end.
Figure 10B:
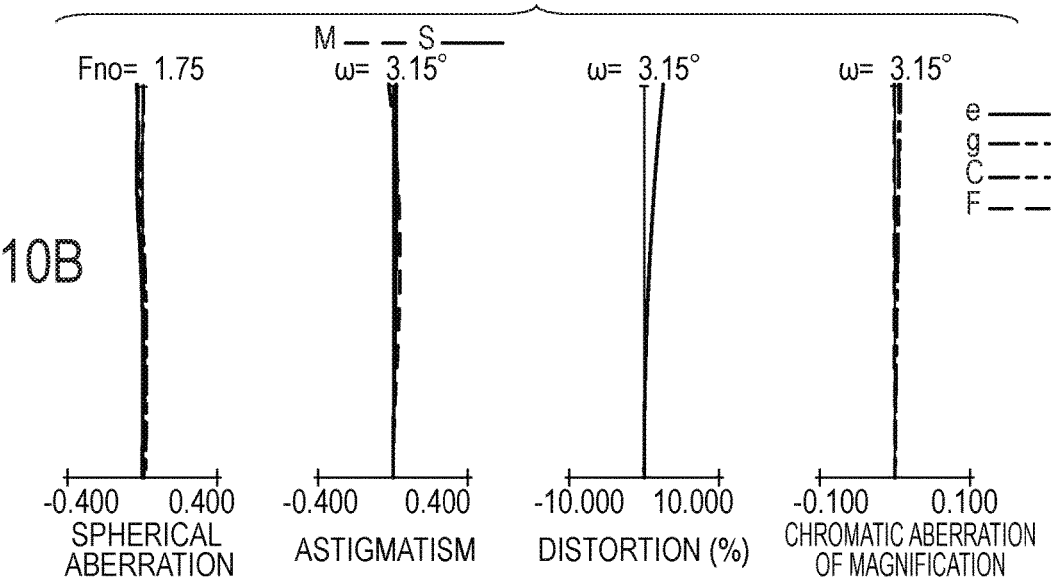
FIG. 10B is an aberration diagram of the zoom lens of Numerical Embodiment 5 focused at infinity at f=100 mm.
Figure 10C:
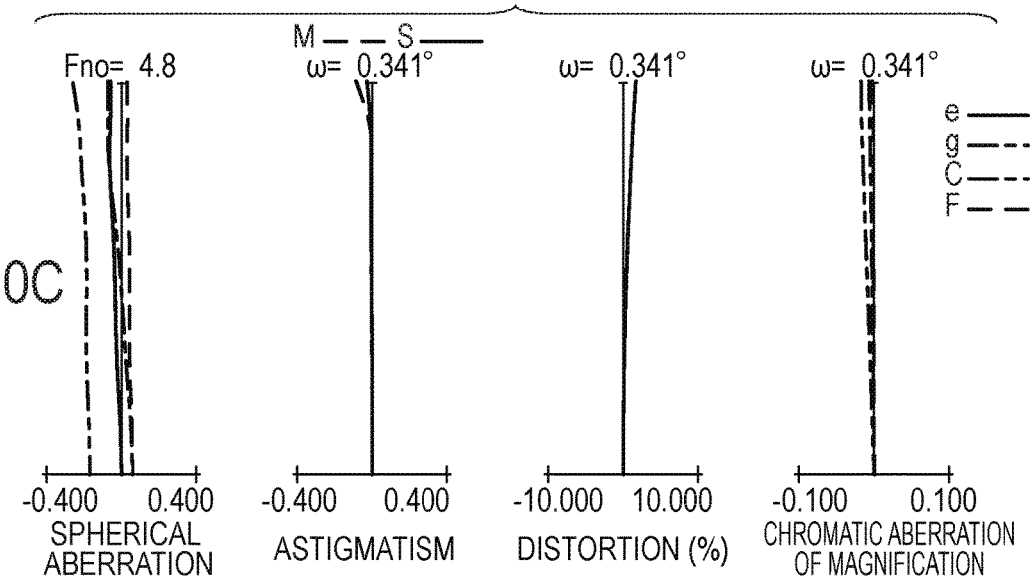
FIG. 10C is an aberration diagram of the zoom lens of Numerical Embodiment 5 focused at infinity at the telephoto end.

FIG. 9 is a lens sectional diagram of a zoom lens according to Embodiment 5 (Numerical Embodiment 5) of the present invention focused at infinity at the wide angle of view. FIGS. 10A, 10B, and 10C illustrate longitudinal aberration diagrams of the zoom lens focused at infinity at the wide angle end, at a focal length of 100 mm, and at the telephoto end, respectively.

The zoom lens in FIG. 9 includes, in order from the object side, a first lens unit L1 having a positive refractive power configured to be moved for focusing, a second lens unit L2 having a negative refractive power configured to be moved to the image side for zooming from the wide angle end to the telephoto end, a third lens unit L3 having a positive refractive power configured to be moved to the object side for zooming from the wide angle end to the telephoto end, a fourth lens unit L4 having a positive refractive power configured to be moved non-linearly on the optical axis in conjunction with the movement of the second lens unit L2 and the third lens unit L3 in order to correct image plane variation caused by zooming, and a fifth lens unit L5 configured not to be moved for zooming. In this embodiment, the rear lens group corresponds to the third lens unit L3 to the fifth lens unit L5.

In this embodiment, the second lens unit L2, the third lens unit L3, and the fourth lens unit L4 form the zooming system. "SP" denotes an aperture stop, which is disposed between the fourth lens unit L4 and the fifth lens unit L5 and configured not to be moved in the optical-axis direction for zooming.

The first lens unit L1 corresponds to the 1st to 12th surfaces. The second lens unit L2 corresponds to the 13th to 22nd surfaces, the third lens unit L3 corresponds to the 23rd to 24th surfaces, and the fourth lens unit L4 corresponds to the 25th to 31st surfaces. The fifth lens unit L5 corresponds to the 33rd to 55th surfaces. The first lens unit L1 consists of a 1-1 lens subunit L11 configured not to be moved for focusing and a 1-2 lens subunit L12 having a positive refractive power configured to be moved for focusing from infinity to close-up. The 1-1 lens subunit L11 corresponds to the 1st to 6th surfaces, and the 1-2 lens subunit L12 corresponds to the 7th to 12th surfaces. The first lens unit L1 consists of six lenses which are, in order from the object side, a biconcave lens, a biconvex lens, a biconvex lens, a biconvex lens, a meniscus convex lens having a concave surface facing the image side, and a meniscus convex lens having a concave surface facing the image side.

Table 1 shows values corresponding to the conditional expressions of Embodiment 5. Embodiment 5 satisfies Expressions (1) to (7) to appropriately set the lens configuration, refractive power, and glass material of the first lens unit. Thereby, the zoom lens achieves a wide angle of view, a high zoom ratio, reduction in size and weight, and high optical performance over the entire zoom range.

Embodiment 6

Figure 11:
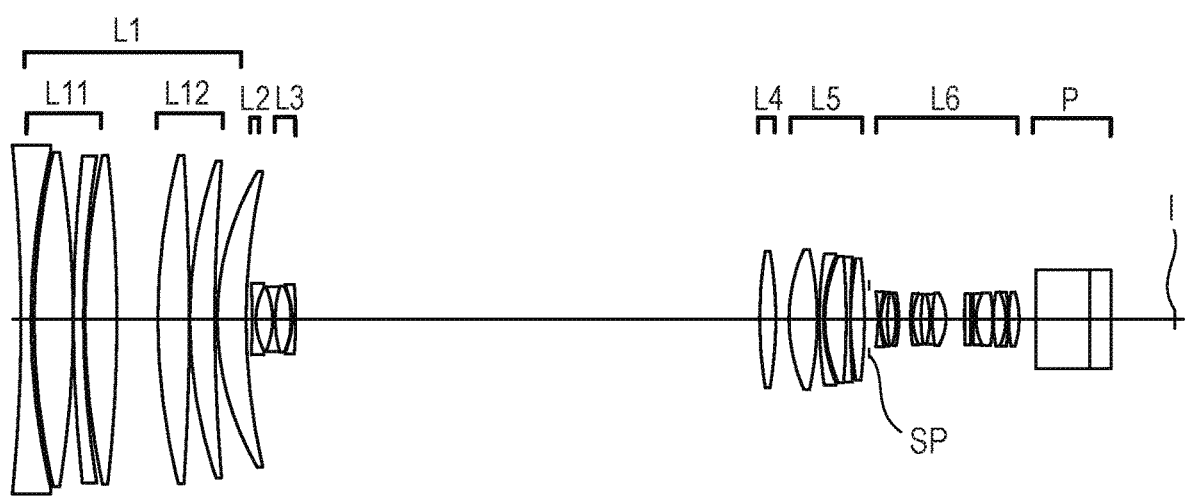
FIG. 11 is a lens sectional diagram of a zoom lens of Numerical Embodiment 6 focused at infinity at the wide angle end.
Figure 12A:
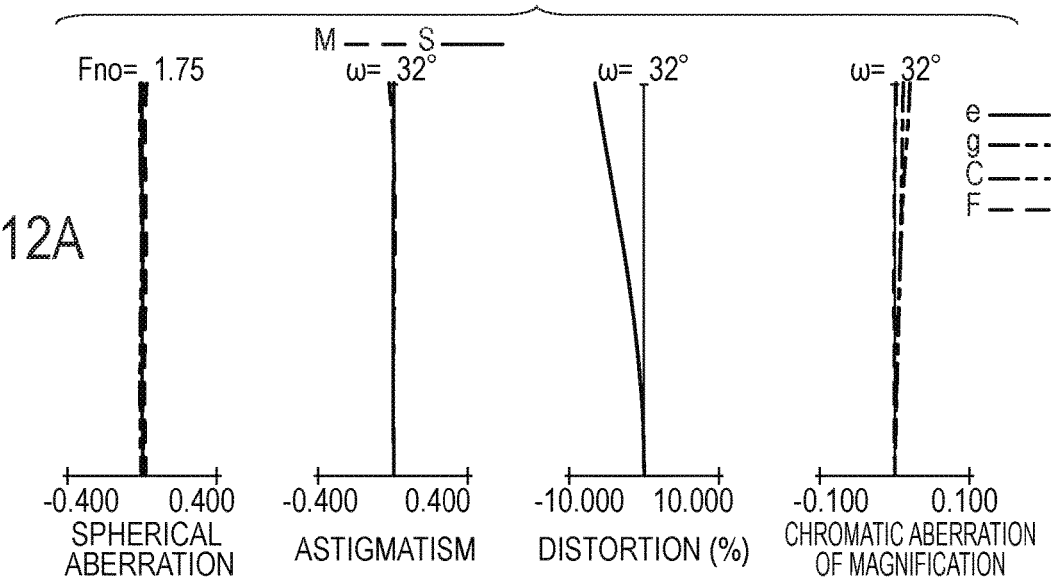
FIG. 12A is an aberration diagram of the zoom lens of Numerical Embodiment 6 focused at infinity at the wide angle end.
Figure 12B:
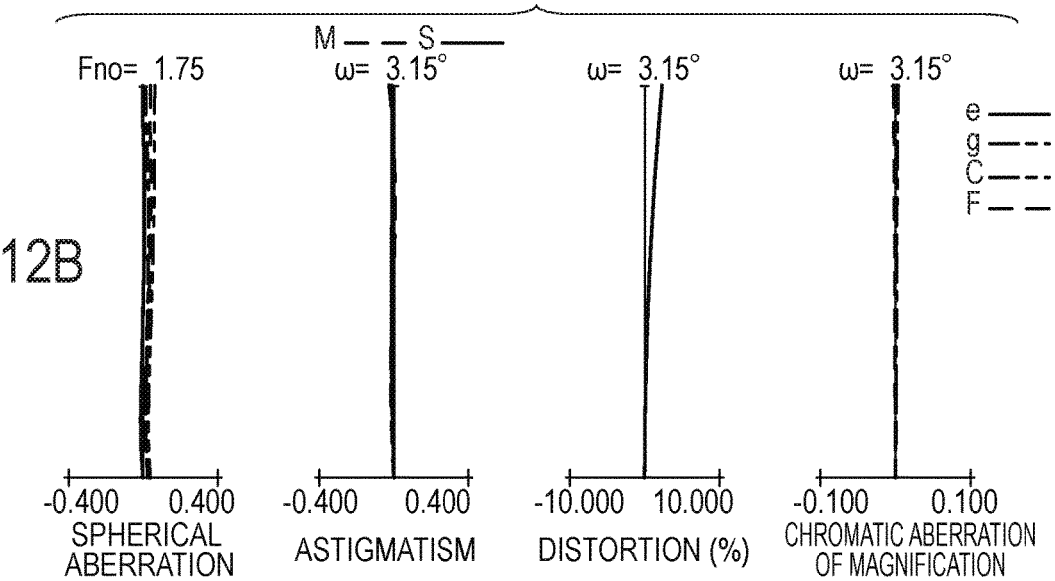
FIG. 12B is an aberration diagram of the zoom lens of Numerical Embodiment 6 focused at infinity at f=100 mm.
Figure 12C:
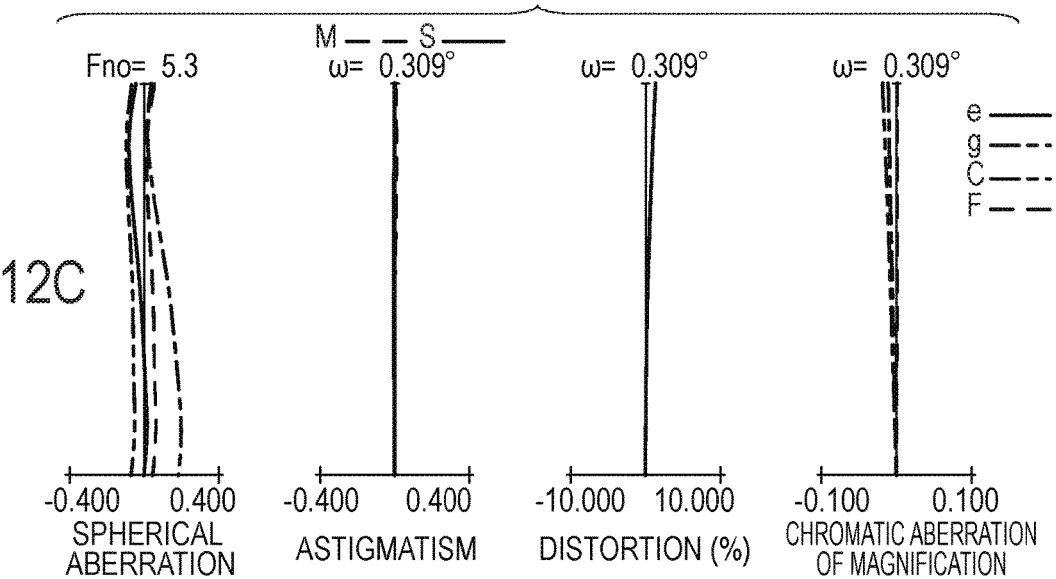
FIG. 12C is an aberration diagram of the zoom lens of Numerical Embodiment 6 focused at infinity at the telephoto end.

FIG. 11 is a lens sectional diagram of a zoom lens according to Embodiment 6 (Numerical Embodiment 6) of the present invention focused at infinity at the wide angle of view. FIGS. 12A, 12B, and 12C illustrate longitudinal aberration diagrams of the zoom lens focused at infinity at the wide angle end, at a focal length of 100 mm, and at the telephoto end, respectively.

The zoom lens in FIG. 11 includes, in order from the object side, a first lens unit L1 having a positive refractive power configured to be moved for focusing, a second lens unit L2 having a negative refractive power configured to be moved to the image side for zooming from the wide angle end to the telephoto end, a third lens unit L3 having a negative refractive power configured to be moved to the object side for zooming from the wide angle end to the telephoto end, a fourth lens unit L4 having a positive refractive power configured to be moved to the object side for zooming from the wide angle end to the telephoto end, a fifth lens unit L5 having a positive refractive power configured to be moved non-linearly on the optical axis in conjunction with the movement of the second lens unit L2, the third lens unit L3, and the fourth lens unit L4 in order to correct image plane variation caused by zooming, and a sixth lens unit L6 configured not to be moved for zooming. In this embodiment, the rear lens group corresponds to the third lens unit L3 to the sixth lens unit L6.

In this embodiment, the second lens unit L2, the third lens unit L3, the fourth lens unit L4, and the fifth lens unit L5 form the zooming system. "SP" denotes an aperture stop, which is disposed between the fifth lens unit L5 and the sixth lens unit L6 and configured not to be moved in the optical-axis direction for zooming.

The first lens unit L1 corresponds to the 1st to 14th surfaces. The second lens unit L2 corresponds to the 15th to 16th surfaces, the third lens unit L3 corresponds to the 17th to 21st surfaces, and the fourth lens unit L4 corresponds to the 22nd to 23rd surfaces. The fifth lens unit L5 corresponds to the 24th to 32nd surfaces, and the sixth lens unit L6 corresponds to the 34th to 55th surfaces. The first lens unit L1 consists of a 1-1 lens subunit L11 configured not to be moved for focusing and a 1-2 lens subunit L12 having a positive refractive power configured to be moved for focusing from infinity to close-up. The 1-1 lens subunit L11 corresponds to the 1st to 8th surfaces, and the 1-2 lens subunit L12 corresponds to the 9th to 14th surfaces. The first lens unit L1 consists of seven lenses which are, in order from the object side, a biconcave lens, a biconvex lens, a biconcave lens, a biconvex lens, a biconvex lens, a meniscus convex lens having a concave surface facing the image side, and a meniscus convex lens having a concave surface facing the image side.

Table 1 shows values corresponding to the conditional expressions of Embodiment 6. Embodiment 6 satisfies Expressions (1) to (5) and (7) to appropriately set the lens configuration, refractive power, and glass material of the first lens unit. Thereby, the zoom lens achieves a wide angle of view, a high zoom ratio, reduction in size and weight, and high optical performance over the entire zoom range.

Embodiment 7

Figure 13:
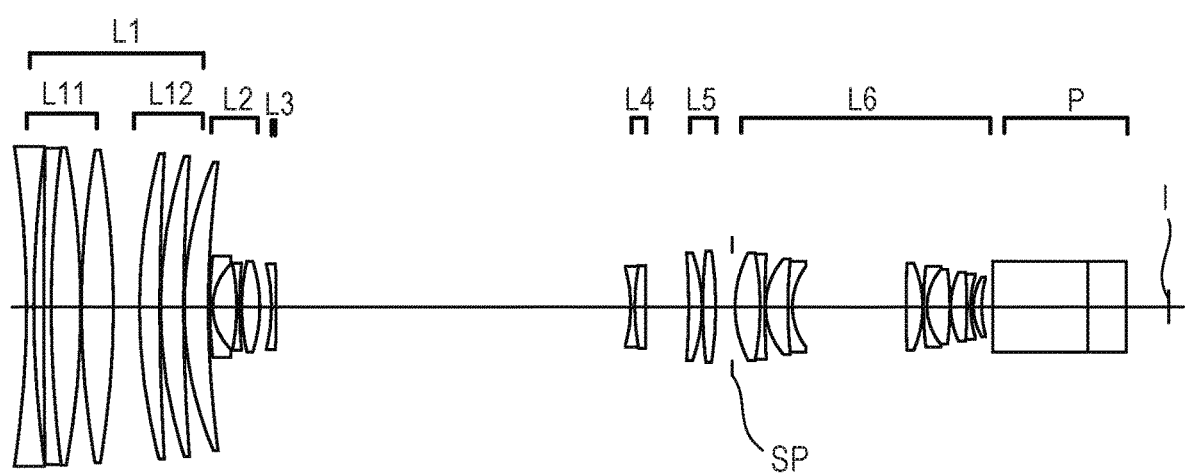
FIG. 13 is a lens sectional diagram of a zoom lens of Numerical Embodiment 7 focused at infinity at the wide angle end.
Figure 14A:
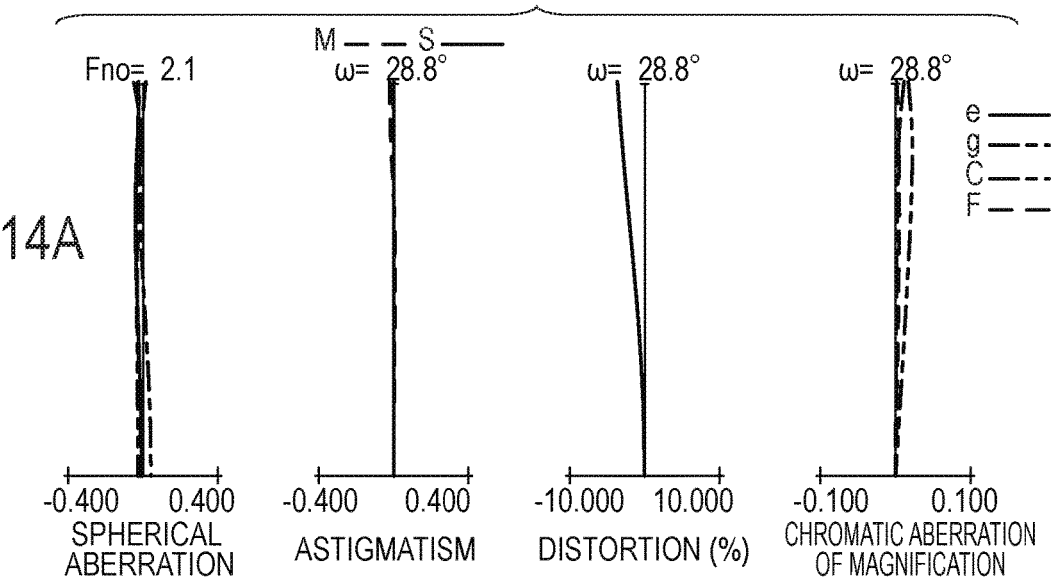
FIG. 14A is an aberration diagram of the zoom lens of Numerical Embodiment 7 focused at infinity at the wide angle end.
Figure 14B:
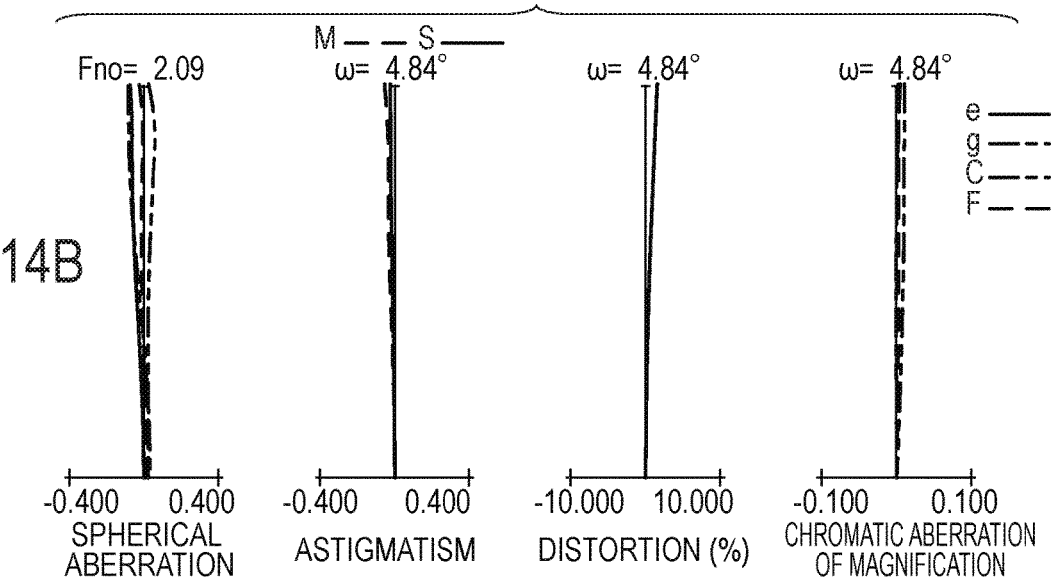
FIG. 14B is an aberration diagram of the zoom lens of Numerical Embodiment 7 focused at infinity at f=65 mm.
Figure 14C:
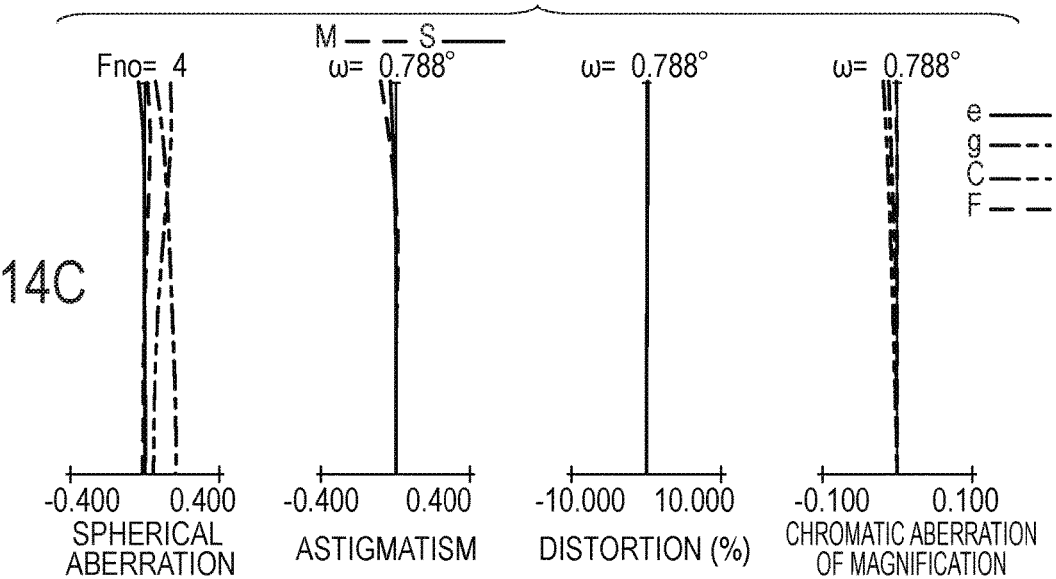
FIG. 14C is an aberration diagram of the zoom lens of Numerical Embodiment 7 focused at infinity at the telephoto end.

FIG. 13 is a lens sectional diagram of a zoom lens according to Embodiment 7 (Numerical Embodiment 7) of the present invention focused at infinity at the wide angle of view. FIGS. 14A, 14B, and 14C illustrate longitudinal aberration diagrams of the zoom lens focused at infinity at the wide angle end, at a focal length of 65 mm, and the telephoto end, respectively.

The zoom lens in FIG. 13 includes, in order from the object side, a first lens unit L1 having a positive refractive power configured to be moved for focusing, a second lens unit L2 having a negative refractive power configured to be moved to the image side for zooming from the wide angle end to the telephoto end, a third lens unit L3 having a negative refractive power configured to be moved to the image side for zooming from the wide angle end to the telephoto end, a fourth lens unit L4 having a negative refractive power configured to be moved to the object side and then to the image side for zooming from the wide angle end to the telephoto end, a fifth lens unit L5 having a positive refractive power configured to be moved non-linearly on the optical axis in conjunction with the movement of the second lens unit L2, the third lens unit L3, and the fourth lens unit L4 in order to correct image plane variation caused by zooming, and a sixth lens unit L6 configured not to be moved for zooming. In this embodiment, the rear lens group corresponds to the third lens unit L3 to the sixth lens unit L6.

In this embodiment, the second lens unit L2, the third lens unit L3, the fourth lens unit L4, and the fifth lens unit L5 form the zooming system. "SP" denotes an aperture stop, which is disposed between the fifth lens unit L5 and the sixth lens unit L6 and configured not to be moved in the optical-axis direction for zooming.

The first lens unit L1 corresponds to the 1st to 13th surfaces. The second lens unit L2 corresponds to the 14th to 19th surfaces, the third lens unit L3 corresponds to the 20th to 21st surfaces, and the fourth lens unit L4 corresponds to the 22nd to 24th surfaces. The fifth lens unit L5 corresponds to the 25th to 28th surfaces, and the sixth lens unit L6 corresponds to the 30th to 45th surfaces. The first lens unit L1 consists of a 1-1 lens subunit L11 configured not to be moved for focusing and a 1-2 lens subunit L12 having a positive refractive power configured to be moved for focusing from infinity to close-up. The 1-1 lens subunit L11 corresponds to the 1st to 7th surfaces, and the 1-2 lens subunit L12 corresponds to the 8th to 13th surfaces. The first lens unit L1 consists of seven lenses which are, in order from the object side, a biconcave lens, a cemented lens formed by a meniscus concave lens having a convex surface facing the object side and a biconvex lens, a biconvex lens, a meniscus convex lens having a concave surface facing the image side, a meniscus convex lens having a concave surface facing the image side, and a meniscus convex lens having a concave surface facing the image side.

Table 1 shows values corresponding to the conditional expressions of Embodiment 7. Embodiment 7 satisfies Expressions (1) to (4), (6), and (7) to appropriately set the lens configuration, refractive power, and glass material of the first lens unit. Thereby, the zoom lens achieves a wide angle of view, a high zoom ratio, reduction in size and weight, and high optical performance over the entire zoom range.

Embodiment 8

Figure 15:
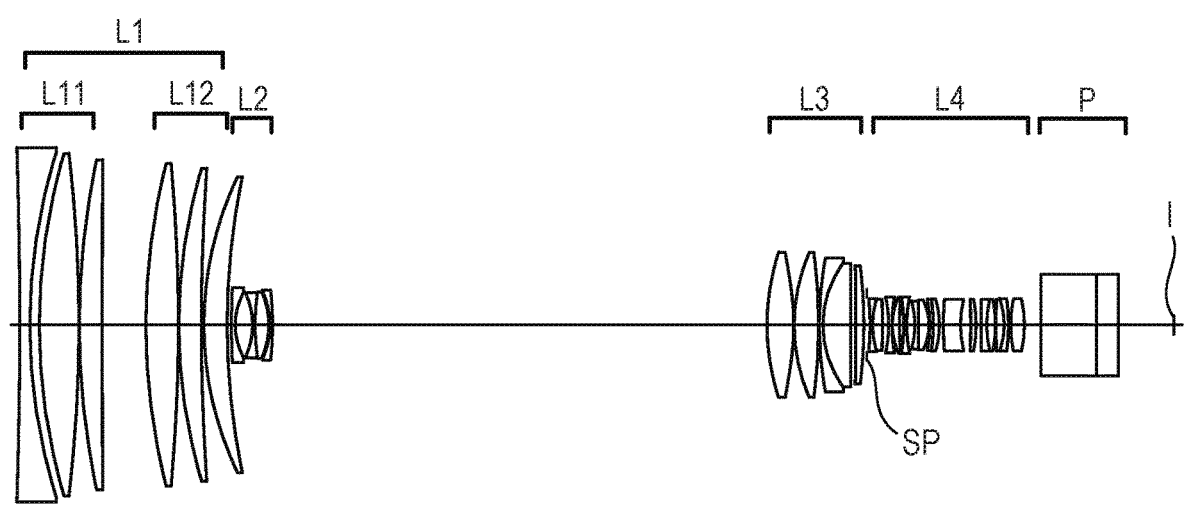
FIG. 15 is a lens sectional diagram of a zoom lens of Numerical Embodiment 8 focused at infinity at the wide angle end.
Figure 16A:
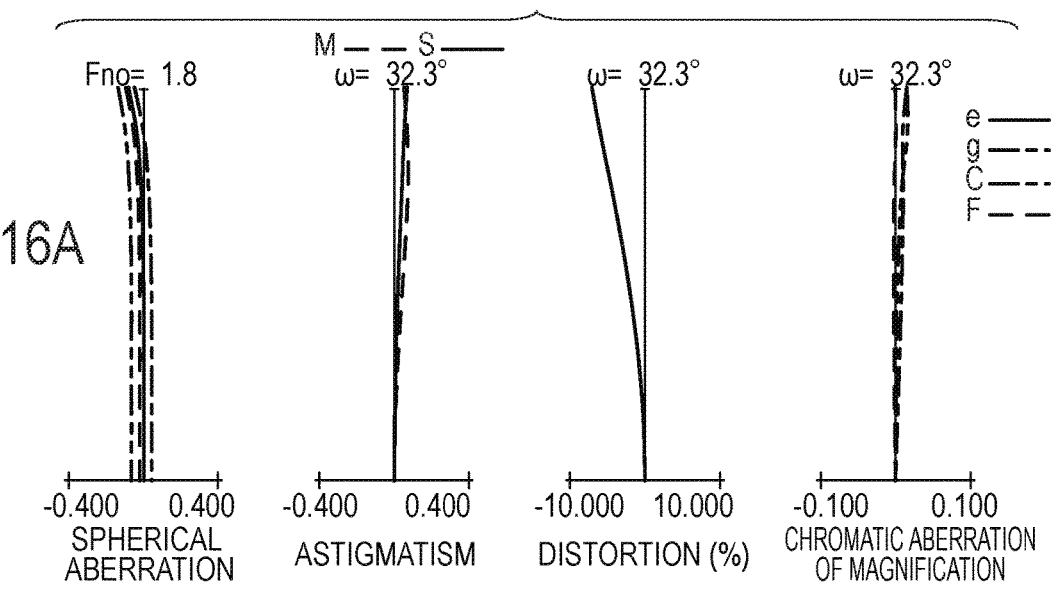
FIG. 16A is an aberration diagram of the zoom lens of Numerical Embodiment 8 focused at infinity at the wide angle end.
Figure 16B:
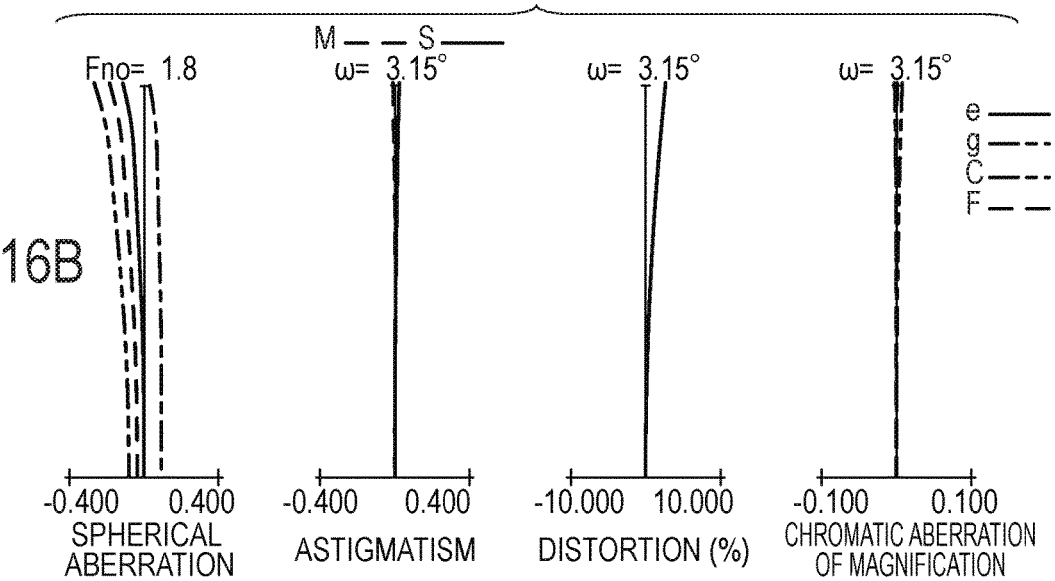
FIG. 16B is an aberration diagram of the zoom lens of Numerical Embodiment 8 focused at infinity at f=100 mm.
Figure 16C:
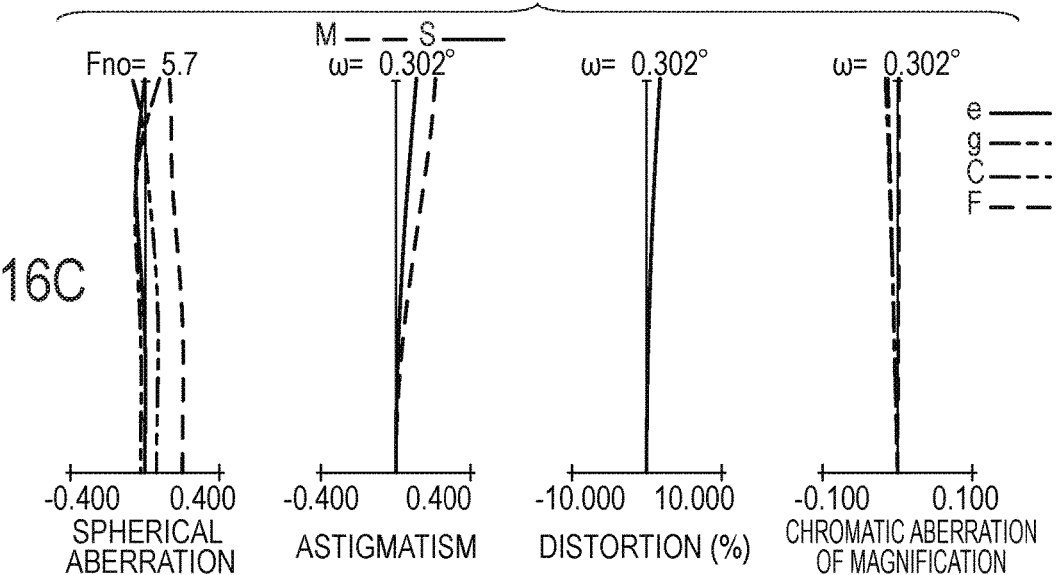
FIG. 16C is an aberration diagram of the zoom lens of Numerical Embodiment 8 focused at infinity at the telephoto end.

FIG. 15 is a lens sectional diagram of a zoom lens according to Embodiment 8 (Numerical Embodiment 8) of the present invention focused at infinity at the wide angle of view. FIGS. 16A, 16B, and 16C illustrate longitudinal aberration diagrams of the zoom lens focused at infinity at the wide angle end, at a focal length of 100 mm, and at the telephoto end, respectively.

The zoom lens in FIG. 15 includes, in order from the object side, a first lens unit L1 for focusing having a positive refractive power, a second lens unit L2 having a negative refractive power configured to be moved to the image side for zooming from the wide angle end to the telephoto end, a third lens unit L3 having a positive refractive power configured to be moved non-linearly on the optical axis in conjunction with the movement of the second lens unit L2 in order to correct image plane variation caused by zooming, and a fourth lens unit L4 configured not to be moved for zooming. In this embodiment, the rear lens group corresponds to the third lens unit L3 and the fourth lens unit L4.

In this embodiment, the second lens unit L2 and the third lens unit L3 form the zooming system. "SP" denotes an aperture stop, which is disposed between the third lens unit L3 and the fourth lens unit L4 and configured not to be moved in the optical-axis direction for zooming.

The first lens unit L1 corresponds to the 1st to 12th surfaces. The second lens unit L2 corresponds to the 13th to 19th surfaces, the third lens unit L3 corresponds to the 20th to 28th surfaces, and the fourth lens unit L4 corresponds to the 30th to 56th surfaces. The first lens unit L1 consists of a 1-1 lens subunit L11 configured not to be moved for focusing and a 1-2 lens subunit L12 having a positive refractive power configured to be moved for focusing from infinity to close-up. The 1-1 lens subunit L11 corresponds to the 1st to 6th surfaces, and the 1-2 lens subunit L12 corresponds to the 7th to 12th surfaces. The first lens unit L1 consists of six lenses which are, in order from the object side, a biconcave lens, a biconvex lens, a meniscus convex lens having a concave surface facing the image side, a biconvex lens, a meniscus convex lens having a concave surface facing the image side, and a meniscus convex lens having a concave surface facing the image side.

Table 1 shows values corresponding to the conditional expressions of Embodiment 8. Embodiment 8 satisfies Expressions (1) to (7) to appropriately set the lens configuration, refractive power, and glass material of the first lens unit. Thereby, the zoom lens achieves a wide angle of view, a high zoom ratio, reduction in size and weight, and high optical performance over the entire zoom range.

Although the preferred embodiments of the present invention have been described above, the present invention is not limited to those embodiments and is variously modifiable and changeable within the gist thereof. The present invention is characterized by the appropriate setting of the lens configuration, refractive power, and glass material of the first lens unit, and the advantageous effects can be still produced when the rear lens group, which corresponds to lens units on the image side of the second lens unit, has a configuration other than those described in Numerical Embodiments 1 to 8.

Numerical Embodiment 1

| | | | [Unit mm] | | | |
|---|---|---|---|---|---|---|
| | | | Surface data | | | |
| Surface number | r | d | nd | vd | θgF | Effective diameter |
| 1 | −2942.18811 | 6.00000 | 1.834810 | 42.74 | 0.5648 | 212.002 |
| 2 | 335.45859 | 1.80000 | | | | 200.133 |
| 3 | 335.06633 | 23.70767 | 1.433870 | 95.10 | 0.5373 | 199.514 |
| 4 | −1057.92901 | 0.20000 | | | | 198.161 |
| 5 | 525.29863 | 14.68252 | 1.433870 | 95.10 | 0.5373 | 198.476 |
| 6 | −2449.90453 | 25.25075 | | | | 198.589 |
| 7 | 377.04224 | 20.53079 | 1.433870 | 95.10 | 0.5373 | 199.204 |
| 8 | −1365.49684 | 0.25000 | | | | 198.661 |
| 9 | 306.95406 | 16.15620 | 1.433870 | 95.10 | 0.5373 | 193.061 |
| 10 | 1716.23164 | 1.49946 | | | | 191.758 |
| 11 | 188.24393 | 16.19337 | 1.438750 | 94.66 | 0.5340 | 180.210 |
| 12 | 408.07756 | (variable) | | | | 178.091 |
| 13 | −532.82374 | 2.20000 | 2.003300 | 28.27 | 0.5980 | 45.145 |
| 14 | 38.13165 | 11.72245 | | | | 38.748 |
| 15 | −44.54614 | 1.45000 | 1.743198 | 49.34 | 0.5531 | 37.567 |
| 16 | 72.56546 | 9.77415 | 1.892860 | 20.36 | 0.6393 | 38.794 |
| 17 | −46.48441 | 1.62858 | | | | 39.876 |
| 18 | −41.75805 | 2.00000 | 1.882997 | 40.76 | 0.5667 | 39.814 |
| 19 | −152.60813 | (variable) | | | | 42.397 |
| 20 | 152.33559 | 11.49260 | 1.729157 | 54.68 | 0.5444 | 83.173 |
| 21 | −265.71450 | 6.61910 | | | | 83.460 |
| 22 | 139.88768 | 13.50202 | 1.438750 | 94.66 | 0.5340 | 83.757 |
| 23 | −246.30392 | 0.49825 | | | | 83.128 |
| 24 | 264.09410 | 2.60000 | 1.854780 | 24.80 | 0.6122 | 80.161 |
| 25 | 97.10593 | (variable) | | | | 77.382 |
| 26 | 86.50601 | 15.38886 | 1.496999 | 81.54 | 0.5375 | 77.639 |
| 27 | −236.96933 | 0.50000 | | | | 76.744 |
| 28 | 415.87662 | 2.50000 | 1.805181 | 25.42 | 0.6161 | 73.398 |
| 29 | 139.36202 | 7.84908 | 1.603112 | 60.64 | 0.5415 | 71.070 |
| 30 | −764.20052 | (variable) | | | | 69.842 |
| 31 (stop) | ∞ | 5.45833 | | | | 34.134 |
| 32 | −100.58829 | 1.40000 | 1.882997 | 40.76 | 0.5667 | 31.362 |
| 33 | 50.28488 | 1.36347 | | | | 30.487 |
| 34 | 40.81657 | 3.59528 | 1.922860 | 18.90 | 0.6495 | 30.974 |
| 35 | 96.04198 | 4.18687 | | | | 30.494 |
| 36 | −79.86582 | 1.70000 | 1.804000 | 46.53 | 0.5577 | 30.147 |
| 37 | −114.43939 | 7.69473 | | | | 30.251 |
| 38 | 447.23261 | 1.50000 | 1.804000 | 46.53 | 0.5577 | 29.104 |
| 39 | 36.26082 | 4.29014 | 1.846660 | 23.87 | 0.6205 | 28.682 |
| 40 | 154.67305 | 4.70815 | | | | 28.446 |
| 41 | −40.89612 | 1.50000 | 1.891900 | 37.13 | 0.5780 | 28.350 |
| 42 | 100.53116 | 8.12196 | 1.516330 | 64.14 | 0.5353 | 29.957 |
| 43 | −29.81855 | 12.96157 | | | | 31.195 |
| 44 | 95.10916 | 5.83122 | 1.517417 | 52.43 | 0.5564 | 33.399 |
| 45 | −65.82347 | 1.39999 | | | | 33.299 |
| 46 | −142.70016 | 1.50000 | 1.882997 | 40.76 | 0.5667 | 32.371 |
| 47 | 37.95063 | 7.64407 | 1.487490 | 70.23 | 0.5300 | 31.922 |
| 48 | −86.09780 | 0.20000 | | | | 32.324 |
| 49 | 111.79843 | 7.62511 | 1.517417 | 52.43 | 0.5564 | 32.455 |
| 50 | −35.37773 | 1.50000 | 1.882997 | 40.76 | 0.5667 | 32.274 |
| 51 | −107.94732 | 0.20000 | | | | 32.859 |

-continued

[Unit mm]

| | | | | | | |
|---|---|---|---|---|---|---|
| 52 | 90.09429 | 7.67048 | 1.539956 | 59.46 | 0.5441 | 32.842 |
| 53 | −53.74072 | 10.00000 | | | | 32.352 |
| 54 | 0.00000 | 33.00000 | 1.608590 | 46.44 | 0.5664 | 60.000 |
| 55 | 0.00000 | 13.20000 | 1.516330 | 64.15 | 0.5352 | 60.000 |
| 56 | 0.00000 | 0.00000 | | | | 60.000 |

Aspheric surface data

13th surface

K = 1.99852e+000  A4 = 1.15677e−006  A6 = −2.75064e−008  A8 = −3.06848e−010
A10 = 9.10515e−013  A12 = 3.28486e−015  A14 = 1.35261e−018  A16 = 5.54400e−022
A3 = 2.74335e−007  A5 = 9.95673e−008  A7 = 4.02226e−009  A9 = 6.12079e−012
A11 = −8.52506e−014  A13 = −6.85632e−017  A15 = −3.84859e−020

21th surface

K = 1.21093e+001  A4 = 2.82183e−007  A6 = −5.59441e−011  A8 = −2.00796e−014
A10 = 9.78964e−017  A12 = −6.30815e−020  A14 = 1.70834e−023  A16 = −4.73901e−027
A3 = −2.90901e−008  A5 = 1.58196e−009  A7 = 1.10620e−012  A9 = −1.50730e−015
A11 = 5.86871e−020  A13 = 1.04584e−022  A15 = 1.44467e−025

30th surface

K = −2.23400e+002  A4 = 2.77687e−007  A6 = 4.69555e−010  A8 = 1.39733e−013
A10 = −2.98156e−016  A12 = 4.58582e−019  A14 = −2.25443e−022  A16 = 5.80568e−026
A3 = 1.70768e−007  A5 = −5.73181e−009  A7 = −1.36230e−011  A9 = 7.92918e−015
A11 = −8.14405e−018  A13 = 2.06016e−021  A15 = −8.57551e−025

Various data
Zoom ratio 120.00

| | Wide angle | Middle | Telephoto |
|---|---|---|---|
| Focal length | 8.50 | 100.00 | 1020.00 |
| F-number | 1.75 | 1.75 | 5.30 |
| Angle of view (deg) | 32.91 | 3.15 | 0.31 |
| Image height | 5.50 | 5.50 | 5.50 |
| Total lens length | 677.55 | 677.55 | 677.55 |
| BF | 13.30 | 13.30 | 13.30 |
| d12 | 3.47 | 154.53 | 194.08 |
| d19 | 289.33 | 96.93 | 2.00 |
| d25 | 4.21 | 10.31 | 4.50 |
| d30 | 2.99 | 38.24 | 99.42 |
| d56 | 13.30 | 13.30 | 13.30 |
| Entrance pupil position | 133.62 | 1087.74 | 14063.25 |
| Exit pupil position | 166.67 | 166.67 | 166.67 |
| Front principal point position | 142.60 | 1252.93 | 21866.59 |
| Rear principal point position | 4.80 | −86.70 | −1006.70 |

Zoom lens unit data

| Unit | Start surface | Focal length | Lens structure length | Front principal point position | Rear principal point position |
|---|---|---|---|---|---|
| 1 | 1 | 251.50 | 126.27 | 72.69 | −19.27 |
| 2 | 13 | −24.07 | 28.78 | 3.62 | −16.98 |
| 3 | 20 | 134.62 | 34.71 | −5.03 | −27.55 |
| 4 | 26 | 112.37 | 26.24 | 4.27 | −13.07 |
| 5 | 31 | 42.11 | 148.25 | 58.68 | 17.53 |

Numerical Embodiment 2

[Unit mm]

Surface data

| Surface number | r | d | nd | vd | θgF | Effective diameter |
|---|---|---|---|---|---|---|
| 1 | −2952.64955 | 6.00000 | 1.834000 | 37.16 | 0.5776 | 212.010 |
| 2 | 382.14038 | 1.80000 | | | | 202.136 |
| 3 | 388.86609 | 24.39740 | 1.433870 | 95.10 | 0.5373 | 201.686 |

-continued

[Unit mm]

| | | | | | | |
|---|---|---|---|---|---|---|
| 4 | −700.71634 | 0.20000 | | | | 200.236 |
| 5 | 765.02799 | 9.43214 | 1.496999 | 81.54 | 0.5375 | 197.717 |
| 6 | 26529.27877 | 24.09090 | | | | 197.762 |
| 7 | 344.60037 | 19.76446 | 1.433870 | 95.10 | 0.5373 | 198.724 |
| 8 | −3028.72960 | 0.25000 | | | | 198.149 |
| 9 | 273.92589 | 18.29025 | 1.433870 | 95.10 | 0.5373 | 192.996 |
| 10 | 1815.20913 | 1.49727 | | | | 191.662 |
| 11 | 203.60531 | 14.55714 | 1.496999 | 81.54 | 0.5375 | 180.653 |
| 12 | 418.21430 | (variable) | | | | 178.680 |
| 13 | −358.51551 | 2.20000 | 2.003300 | 28.27 | 0.5980 | 48.599 |
| 14 | 44.27894 | 10.21274 | | | | 42.067 |
| 15 | −75.14372 | 1.45000 | 1.834810 | 42.74 | 0.5648 | 40.882 |
| 16 | 49.98154 | 10.12963 | 1.922860 | 18.90 | 0.6495 | 40.623 |
| 17 | −63.54174 | 2.73098 | | | | 40.442 |
| 18 | −47.37298 | 2.00000 | 1.882997 | 40.76 | 0.5667 | 39.835 |
| 19 | −457.41251 | (variable) | | | | 42.053 |
| 20 | 147.89828 | 11.09124 | 1.696797 | 55.53 | 0.5434 | 83.624 |
| 21 | −277.54144 | 1.34342 | | | | 83.936 |
| 22 | 131.80447 | 17.76338 | 1.438750 | 94.66 | 0.5340 | 85.204 |
| 23 | −129.83682 | 2.54492 | | | | 84.760 |
| 24 | 296.71336 | 2.60000 | 1.854780 | 24.80 | 0.6122 | 78.396 |
| 25 | 99.83596 | (variable) | | | | 75.434 |
| 26 | 115.98526 | 2.50000 | 1.854780 | 24.80 | 0.6122 | 74.905 |
| 27 | 77.12734 | 11.07954 | 1.496999 | 81.54 | 0.5375 | 73.033 |
| 28 | 1707.17446 | 0.20000 | | | | 72.640 |
| 29 | 149.30923 | 8.66198 | 1.603112 | 60.64 | 0.5415 | 71.665 |
| 30 | −462.58889 | (variable) | | | | 70.679 |
| 31 (stop) | ∞ | 5.34463 | | | | 33.793 |
| 32 | −106.81540 | 1.40000 | 1.882997 | 40.76 | 0.5667 | 31.082 |
| 33 | 47.77336 | 1.10755 | | | | 30.181 |
| 34 | 38.57762 | 3.75204 | 1.922860 | 18.90 | 0.6495 | 30.648 |
| 35 | 95.73986 | 4.68476 | | | | 30.143 |
| 36 | −58.02741 | 1.70000 | 1.804000 | 46.53 | 0.5577 | 29.748 |
| 37 | −87.80328 | 7.40942 | | | | 29.981 |
| 38 | 123.41469 | 1.50000 | 1.804000 | 46.53 | 0.5577 | 29.021 |
| 39 | 31.45397 | 4.72312 | 1.846660 | 23.87 | 0.6205 | 28.372 |
| 40 | 65.61846 | 6.13690 | | | | 27.856 |
| 41 | −32.58347 | 1.50000 | 1.891900 | 37.13 | 0.5780 | 27.904 |
| 42 | 228.71899 | 8.24751 | 1.516330 | 64.14 | 0.5353 | 30.231 |
| 43 | −26.92662 | (variable) | | | | 31.799 |
| 44 | 58.80410 | 7.65043 | 1.517417 | 52.43 | 0.5564 | 36.037 |
| 45 | −68.74469 | 1.39994 | | | | 35.850 |
| 46 | −185.00230 | 1.50000 | 1.882997 | 40.76 | 0.5667 | 34.614 |
| 47 | 49.09316 | 8.06805 | 1.487490 | 70.23 | 0.5300 | 33.941 |
| 48 | −58.82288 | 0.20000 | | | | 34.033 |
| 49 | 74.37701 | 9.28723 | 1.517417 | 52.43 | 0.5564 | 32.901 |
| 50 | −39.92795 | 1.50000 | 1.882997 | 40.76 | 0.5667 | 31.569 |
| 51 | −244.65563 | 0.20000 | | | | 31.243 |
| 52 | 101.89805 | 7.21340 | 1.539956 | 59.46 | 0.5441 | 30.755 |
| 53 | −113.52844 | (variable) | | | | 29.344 |
| 54 | 0.00000 | 33.00000 | 1.608590 | 46.44 | 0.5664 | 60.000 |
| 55 | 0.00000 | 13.20000 | 1.516330 | 64.15 | 0.5352 | 60.000 |
| 56 | 0.00000 | 0.00000 | | | | 60.000 |

Aspheric surface data

13th surface

K = 1.59939e+000  A4 = 1.04493e−006  A6 = −2.62173e−008  A8 = −3.03736e−010
A10 = 8.93863e−013  A12 = 3.23638e−015  A14 = 1.64495e−018  A16 = 5.15456e−022
A3 = 2.63147e−007  A5 = 9.06039e−008  A7 = 3.91967e−009  A9 = 6.19665e−012
A11 = −8.33928e−014  A13 = −7.34880e−017  A15 = −4.16695e−020

21th surface

K = 6.69742e+000  A4 = 4.04488e−007  A6 = −7.32603e−011  A8 = 5.42241e−014
A10 = 7.31719e−017  A12 = −2.97911e−020  A14 = 3.60991e−023  A16 = −2.06168e−028
A3 = −7.03642e−008  A5 = 1.48648e−009  A7 = 5.87324e−013  A9 = −2.59047e−015
A11 = −4.36458e−020  A13 = −6.18036e−022  A15 = −3.45818e−025

29th surface

K = 5.30341e+000  A4 = −2.55551e−007  A6 = −8.14464e−010  A8 = −2.37375e−013
A10 = 5.04334e−016  A12 = −1.38421e−019  A14 = 8.53415e−023  A16 = −8.26363e−026
A3 = −1.19884e−007  A5 = 9.75693e−009  A7 = 2.57406e−011  A9 = −1.52340e−014
A11 = 2.00987e−018  A13 = −6.42083e−021  A15 = 4.85077e−024

-continued

| [Unit mm] | | | |
|---|---|---|---|
| Various data Zoom ratio 125.00 | | | |
| | Wide angle | Middle | Telephoto |
| Focal length | 8.50 | 100.00 | 1062.49 |
| F-number | 1.75 | 1.75 | 5.50 |
| Angle of view (deg) | 32.91 | 3.15 | 0.30 |
| Image height | 5.50 | 5.50 | 5.50 |
| Total lens length | 672.29 | 672.29 | 672.29 |
| BF | 13.92 | 13.92 | 13.92 |
| d12 | 3.66 | 150.66 | 188.54 |
| d19 | 292.86 | 101.86 | 2.00 |
| d25 | 4.46 | 15.10 | 4.73 |
| d30 | 2.97 | 36.33 | 108.68 |
| d43 | 10.97 | 11.06 | 10.97 |
| d53 | 5.93 | 5.84 | 5.93 |
| d56 | 13.92 | 13.92 | 13.92 |
| Entrance pupil position | 132.19 | 1089.06 | 15229.74 |
| Exit pupil position | 192.78 | 191.53 | 192.78 |
| Front principal point position | 141.09 | 1245.37 | 22604.01 |
| Rear principal point position | 5.42 | −86.08 | −1048.57 |

| Zoom lens unit data | | | | | |
|---|---|---|---|---|---|
| Unit | Start surface | Focal length | Lens structure length | Front principal point position | Rear principal point position |
| 1 | 1 | 248.00 | 120.28 | 67.91 | −19.53 |
| 2 | 13 | −24.28 | 28.72 | 5.00 | −14.14 |
| 3 | 20 | 113.57 | 35.34 | −3.01 | −25.41 |
| 4 | 26 | 131.03 | 22.44 | 6.05 | −8.58 |
| 5 | 31 | −33.32 | 47.51 | 12.02 | −27.35 |
| 6 | 44 | 47.89 | 37.02 | 12.52 | −14.51 |
| 7 | 54 | ∞ | 46.20 | 14.58 | −14.58 |

Numerical Embodiment 3

| [Unit mm] | | | | | |
|---|---|---|---|---|---|
| Surface data | | | | | |
| Surface number | r | d | nd | vd | θgF | Effective diameter |
|---|---|---|---|---|---|---|
| 1 | 0.00000 | 5.00000 | 1.516330 | 64.14 | 0.5353 | 218.323 |
| 2 | 0.00000 | 8.00000 | | | | 214.788 |
| 3 | −998.22466 | 6.00000 | 1.788001 | 47.37 | 0.5559 | 212.011 |
| 4 | 311.15990 | 1.80000 | | | | 198.807 |
| 5 | 309.33731 | 25.88420 | 1.433870 | 95.10 | 0.5373 | 198.234 |
| 6 | −853.38024 | 0.20000 | | | | 196.582 |
| 7 | 541.97521 | 17.04207 | 1.433870 | 95.10 | 0.5373 | 194.671 |
| 8 | −951.12069 | 24.68771 | | | | 194.932 |
| 9 | 382.03397 | 19.41205 | 1.433870 | 95.10 | 0.5373 | 196.069 |
| 10 | −1541.37175 | 0.25000 | | | | 195.572 |
| 11 | 299.41393 | 17.10177 | 1.433870 | 95.10 | 0.5373 | 190.640 |
| 12 | 2560.82051 | 1.49828 | | | | 189.388 |
| 13 | 204.14134 | 15.04713 | 1.433870 | 95.10 | 0.5373 | 178.741 |
| 14 | 455.53191 | (variable) | | | | 176.715 |
| 15 | 9143.18075 | 2.20000 | 2.003300 | 28.27 | 0.5980 | 46.899 |
| 16 | 37.53058 | 13.58442 | | | | 40.065 |
| 17 | −37.55847 | 1.45000 | 1.754999 | 52.32 | 0.5475 | 38.703 |
| 18 | 400.99468 | 8.95884 | 1.892860 | 20.36 | 0.6393 | 40.387 |
| 19 | −38.90124 | 1.50583 | | | | 40.925 |
| 20 | −38.88617 | 2.00000 | 1.882997 | 40.76 | 0.5667 | 39.882 |
| 21 | −108.17780 | (variable) | | | | 42.566 |
| 22 | 129.34578 | 12.40474 | 1.729157 | 54.68 | 0.5444 | 79.823 |
| 23 | −224.28722 | 7.98847 | | | | 79.948 |
| 24 | −1234.31437 | 10.08082 | 1.438750 | 94.66 | 0.5340 | 79.428 |
| 25 | −106.01195 | 0.46255 | | | | 79.378 |
| 26 | 643.60139 | 2.60000 | 1.854780 | 24.80 | 0.6122 | 75.636 |

-continued

[Unit mm]

| | | | | | | |
|---|---|---|---|---|---|---|
| 27 | 103.15549 | 10.31357 | 1.496999 | 81.54 | 0.5375 | 73.417 |
| 28 | 1263.01077 | (variable) | | | | 72.791 |
| 29 | 277.90353 | 2.50000 | 1.854780 | 24.80 | 0.6122 | 71.447 |
| 30 | 160.05144 | 0.20000 | | | | 70.506 |
| 31 | 101.14903 | 11.25728 | 1.603112 | 60.64 | 0.5415 | 70.417 |
| 32 | −288.32745 | (variable) | | | | 69.566 |
| 33 (stop) | ∞ | 5.20414 | | | | 34.825 |
| 34 | −126.43417 | 1.40000 | 1.882997 | 40.76 | 0.5667 | 32.198 |
| 35 | 49.48874 | 0.85812 | | | | 31.241 |
| 36 | 40.23871 | 3.65091 | 1.922860 | 18.90 | 0.6495 | 31.597 |
| 37 | 91.12081 | 5.42209 | | | | 31.084 |
| 38 | −47.98001 | 1.70000 | 1.804000 | 46.53 | 0.5577 | 30.706 |
| 39 | −59.08405 | 7.25165 | | | | 31.071 |
| 40 | 64.42205 | 1.50000 | 1.804000 | 46.53 | 0.5577 | 29.612 |
| 41 | 31.25734 | 3.57744 | 1.846660 | 23.87 | 0.6205 | 28.690 |
| 42 | 54.86605 | 9.93462 | | | | 28.112 |
| 43 | −37.93700 | 1.50000 | 1.891900 | 37.13 | 0.5780 | 27.515 |
| 44 | 206.58346 | 7.03923 | 1.516330 | 64.14 | 0.5353 | 28.920 |
| 45 | −30.15528 | 9.53044 | | | | 29.996 |
| 46 | 319.32620 | 4.93362 | 1.517417 | 52.43 | 0.5564 | 31.002 |
| 47 | −52.26221 | 1.39980 | | | | 31.033 |
| 48 | −104.67191 | 1.50000 | 1.882997 | 40.76 | 0.5667 | 30.201 |
| 49 | 34.42737 | 10.16368 | 1.487490 | 70.23 | 0.5300 | 30.053 |
| 50 | −79.95092 | 0.20000 | | | | 31.278 |
| 51 | 152.08205 | 6.76563 | 1.517417 | 52.43 | 0.5564 | 31.686 |
| 52 | −38.44946 | 1.50000 | 1.882997 | 40.76 | 0.5667 | 31.767 |
| 53 | −87.11748 | 0.20000 | | | | 32.447 |
| 54 | 62.55066 | 6.92712 | 1.539956 | 59.46 | 0.5441 | 32.609 |
| 55 | −59.81625 | 10.00000 | | | | 32.195 |
| 56 | 0.00000 | 33.00000 | 1.608590 | 46.44 | 0.5664 | 60.000 |
| 57 | 0.00000 | 13.20000 | 1.516330 | 64.15 | 0.5352 | 60.000 |
| 58 | 0.00000 | 0.00000 | | | | 60.000 |

Aspheric surface data

15th surface

| | | | |
|---|---|---|---|
| K = 1.22862e+000 | A4 = 9.75661e−007 | A6 = −2.92720e−008 | A8 = −3.07531e−010 |
| A10 = 8.92200e−013 | A12 = 3.33890e−015 | A14 = 1.39558e−018 | A16 = 5.56108e−022 |
| A3 = 3.45811e−007 | A5 = 1.23798e−007 | A7 = 4.08618e−009 | A9 = 6.23142e−012 |
| A11 = −8.49263e−014 | A13 = −7.13714e−017 | A15 = −3.86742e−020 | |

23th surface

| | | | |
|---|---|---|---|
| K = 4.27474e+000 | A4 = 4.42986e−007 | A6 = −8.23029e−011 | A8 = −4.49509e−014 |
| A10 = 2.69234e−017 | A12 = −2.93257e−020 | A14 = 4.73480e−023 | A16 = −4.98474e−027 |
| A3 = 2.92285e−008 | A5 = 1.27192e−009 | A7 = 2.28076e−012 | A9 = 2.99151e−017 |
| A11 = 1.01128e−018 | A13 = −1.59757e−021 | A15 = −4.98206e−026 | |

31th surface

| | | | |
|---|---|---|---|
| K = 4.44427e−001 | A4 = −1.38238e−007 | A6 = 5.46001e−011 | A8 = −3.34795e−013 |
| A10 = −1.25473e−015 | A12 = 7.96776e−019 | A14 = −1.22205e−022 | A16 = −1.90720e−025 |
| A3 = −1.51552e−007 | A5 = −1.34038e−009 | A7 = −3.41887e−012 | A9 = 3.31026e−014 |
| A11 = 1.56502e−017 | A13 = −3.00082e−020 | A15 = 1.73545e−023 | |

Various data
Zoom ratio 105.00

| | Wide angle | Middle | Telephoto |
|---|---|---|---|
| Focal length | 8.25 | 100.00 | 866.25 |
| F-number | 1.75 | 1.75 | 4.67 |
| Angle of view (deg) | 33.69 | 3.15 | 0.36 |
| Image height | 5.50 | 5.50 | 5.50 |
| Total lens length | 694.47 | 694.47 | 694.47 |
| BF | 13.28 | 13.28 | 13.28 |
| d14 | 3.19 | 160.44 | 198.84 |
| d21 | 294.25 | 98.52 | 4.00 |
| d28 | 1.50 | 7.51 | 17.59 |
| d32 | 4.46 | 36.93 | 82.98 |
| d58 | 13.28 | 13.28 | 13.28 |
| Entrance pupil position | 142.72 | 1118.61 | 10959.15 |
| Exit pupil position | 135.92 | 135.92 | 135.92 |
| Front principal point position | 151.52 | 1300.15 | 17944.04 |
| Rear principal point position | 5.03 | −86.72 | −852.97 |

-continued

| | [Unit mm] | | | | |
|---|---|---|---|---|---|
| | Zoom lens unit data | | | | |
| Unit | Start surface | Focal length | Lens structure length | Front principal point position | Rear principal point position |
| 1 | 1 | 251.80 | 141.92 | 89.43 | −13.42 |
| 2 | 15 | −25.33 | 29.70 | 3.59 | −18.82 |
| 3 | 22 | 101.14 | 43.85 | 4.43 | −26.69 |
| 4 | 29 | 174.29 | 13.96 | 3.48 | −5.17 |
| 5 | 33 | 40.25 | 148.36 | 60.48 | 15.62 |

Numerical Embodiment 4

| [Unit mm] | | | | | | |
|---|---|---|---|---|---|---|
| Surface data | | | | | | |
| Surface number | r | d | nd | vd | θgF | Effective diameter |
| 1 | −1710.45126 | 6.00000 | 1.882997 | 40.76 | 0.5667 | 211.720 |
| 2 | 343.28451 | 1.40000 | | | | 199.702 |
| 3 | 340.76308 | 22.84373 | 1.433870 | 95.10 | 0.5373 | 199.127 |
| 4 | −1189.30874 | 0.20000 | | | | 197.325 |
| 5 | 501.84555 | 18.22586 | 1.496999 | 81.54 | 0.5375 | 200.158 |
| 6 | −1020.91117 | 23.39842 | | | | 200.351 |
| 7 | 409.35773 | 18.74443 | 1.433870 | 95.10 | 0.5373 | 200.011 |
| 8 | −1760.91683 | 0.25000 | | | | 199.457 |
| 9 | 292.43169 | 15.91910 | 1.433870 | 95.10 | 0.5373 | 194.002 |
| 10 | 1197.32133 | 1.49822 | | | | 192.692 |
| 11 | 200.86305 | 15.41334 | 1.537750 | 74.70 | 0.5392 | 182.645 |
| 12 | 428.48964 | (variable) | | | | 180.548 |
| 13 | −313.13253 | 2.20000 | 2.003300 | 28.27 | 0.5980 | 44.866 |
| 14 | 33.71915 | 12.26576 | | | | 37.588 |
| 15 | −41.16057 | 1.45000 | 1.834810 | 42.74 | 0.5648 | 36.439 |
| 16 | 62.17773 | 8.91591 | 1.922860 | 18.90 | 0.6495 | 38.165 |
| 17 | −62.38400 | 5.38582 | | | | 38.934 |
| 18 | −30.98396 | 2.00000 | 1.882997 | 40.76 | 0.5667 | 39.433 |
| 19 | −37.64090 | (variable) | | | | 41.894 |
| 20 | 95.39226 | 13.72373 | 1.696797 | 55.53 | 0.5434 | 80.341 |
| 21 | −358.40886 | 8.01605 | | | | 79.997 |
| 22 | 411.33331 | 13.04458 | 1.438750 | 94.66 | 0.5340 | 79.228 |
| 23 | −106.61916 | 0.48432 | | | | 78.837 |
| 24 | 209.83014 | 2.60000 | 1.854780 | 24.80 | 0.6122 | 72.620 |
| 25 | 78.79437 | (variable) | | | | 69.203 |
| 26 | 69.63884 | 2.50000 | 1.854780 | 24.80 | 0.6122 | 68.854 |
| 27 | 57.06993 | 15.42195 | 1.496999 | 81.54 | 0.5375 | 66.664 |
| 28 | −234.08629 | (variable) | | | | 65.966 |
| 29 (stop) | ∞ | 4.94237 | | | | 33.092 |
| 30 | −145.71080 | 1.40000 | 1.882997 | 40.76 | 0.5667 | 30.516 |
| 31 | 41.09812 | 1.17793 | | | | 29.467 |
| 32 | 37.22361 | 3.44445 | 1.922860 | 18.90 | 0.6495 | 29.919 |
| 33 | 75.65657 | 5.48487 | | | | 29.433 |
| 34 | −43.90762 | 1.70000 | 1.816000 | 46.62 | 0.5568 | 29.176 |
| 35 | −47.59024 | 7.24906 | | | | 29.589 |
| 36 | 175.43181 | 1.50000 | 1.804000 | 46.53 | 0.5577 | 28.323 |
| 37 | 31.05200 | 4.24489 | 1.846660 | 23.87 | 0.6205 | 27.731 |
| 38 | 94.50727 | 5.01959 | | | | 27.411 |
| 39 | −39.73416 | 1.50000 | 1.891900 | 37.13 | 0.5780 | 27.330 |
| 40 | 93.10685 | 7.93711 | 1.516330 | 64.14 | 0.5353 | 28.920 |
| 41 | −29.16696 | 12.88024 | | | | 30.181 |
| 42 | 68.50752 | 6.68142 | 1.517417 | 52.43 | 0.5564 | 32.814 |
| 43 | −65.55175 | 1.39995 | | | | 32.607 |
| 44 | −107.65742 | 1.50000 | 1.882997 | 40.76 | 0.5667 | 31.683 |
| 45 | 34.89816 | 7.55137 | 1.487490 | 70.23 | 0.5300 | 31.258 |
| 46 | −102.98421 | 0.20000 | | | | 31.752 |
| 47 | 87.36510 | 7.86530 | 1.517417 | 52.43 | 0.5564 | 32.127 |
| 48 | −35.22935 | 1.50000 | 1.882997 | 40.76 | 0.5667 | 32.015 |
| 49 | −100.50763 | 0.20000 | | | | 32.661 |
| 50 | 83.96779 | 6.68159 | 1.539956 | 59.46 | 0.5441 | 32.700 |
| 51 | −53.21268 | 10.00000 | | | | 32.366 |

| [Unit mm] | | | | | |
|---|---|---|---|---|---|
| 52 | 0.00000 | 33.00000 | 1.608590 | 46.44 | 0.5664 | 60.000 |
| 53 | 0.00000 | 13.20000 | 1.516330 | 64.15 | 0.5352 | 60.000 |
| 54 | 0.00000 | 0.00000 | | | | 60.000 |

Aspheric surface data

13th surface

K = −2.00000e+000   A4 = 3.04442e−006   A6 = −2.65777e−008   A8 = −3.20442e−010
A10 = 9.24029e−013   A12 = 3.25049e−015   A14 = 1.48023e−018   A16 = 5.32770e−022
A3 = −4.02893e−007   A5 = 6.26697e−008   A7 = 4.15404e−009   A9 = 6.07014e−012
A11 = −8.37999e−014   A13 = −7.23493e−017   A15 = −3.84154e−020

21th surface

K = 1.04683e+001   A4 = 5.83804e−007   A6 = −2.51358e−010   A8 = 1.09404e−013
A10 = 6.88754e−017   A12 = −6.60352e−020   A14 = 4.72282e−023   A16 = −2.46015e−027
A3 = 2.48858e−007   A5 = 5.83645e−009   A7 = 2.40296e−012   A9 = −3.85730e−015
A11 = 1.04867e−018   A13 = −5.60653e−022   A15 = −3.36579e−025

26th surface

K = −2.13010e−002   A4 = −2.16344e−007   A6 = −1.02471e−009   A8 = −1.44726e−013
A10 = 3.09243e−016   A12 = −5.03381e−019   A14 = 1.26284e−022   A16 = −8.60420e−026
A3 = 3.63917e−007   A5 = 1.58236e−008   A7 = 2.85283e−011   A9 = −1.62628e−014
A11 = 1.42445e−017   A13 = −2.46490e−021   A15 = 4.10158e−024

Various data
Zoom ratio 100.00

| | Wide angle | Middle | Telephoto |
|---|---|---|---|
| Focal length | 8.00 | 100.00 | 799.99 |
| F-number | 1.75 | 1.75 | 4.16 |
| Angle of view (deg) | 34.51 | 3.15 | 0.39 |
| Image height | 5.50 | 5.50 | 5.50 |
| Total lens length | 671.36 | 671.36 | 671.36 |
| BF | 13.29 | 13.29 | 13.29 |
| d12 | 3.49 | 159.38 | 192.90 |
| d19 | 285.83 | 97.08 | 4.00 |
| d25 | 5.48 | 6.15 | 20.79 |
| d28 | 3.10 | 35.29 | 80.22 |
| d54 | 13.29 | 13.29 | 13.29 |
| Entrance pupil position | 125.44 | 1191.73 | 10621.53 |
| Exit pupil position | 143.31 | 143.31 | 143.31 |
| Front principal point position | 133.94 | 1368.65 | 16343.64 |
| Rear principal point position | 5.29 | −86.71 | −786.70 |

Zoom lens unit data

| Unit | Start surface | Focal length | Lens structure length | Front principal point position | Rear principal point position |
|---|---|---|---|---|---|
| 1 | 1 | 245.21 | 123.89 | 71.32 | −16.41 |
| 2 | 13 | −24.15 | 32.22 | 1.67 | −24.50 |
| 3 | 20 | 120.61 | 37.87 | −5.88 | −30.60 |
| 4 | 26 | 123.90 | 17.92 | 2.03 | −9.85 |
| 5 | 29 | 39.44 | 148.26 | 56.98 | 15.16 |

Numerical Embodiment 5

| [Unit mm] | | | | | | |
|---|---|---|---|---|---|---|
| Surface data | | | | | | |
| Surface number | r | d | nd | vd | θgF | Effective diameter |
| 1 | −1636.49852 | 6.00000 | 1.834810 | 42.74 | 0.5648 | 212.015 |
| 2 | 368.42949 | 1.80000 | | | | 200.647 |
| 3 | 363.93351 | 22.01304 | 1.433870 | 95.10 | 0.5373 | 199.967 |
| 4 | −1662.37602 | 0.20000 | | | | 197.818 |
| 5 | 772.41365 | 15.74003 | 1.433870 | 95.10 | 0.5373 | 198.832 |

-continued

[Unit mm]

| | | | | | | |
|---|---|---|---|---|---|---|
| 6 | −751.71544 | 24.50618 | | | | 199.118 |
| 7 | 480.79430 | 17.51537 | 1.433870 | 95.10 | 0.5373 | 200.641 |
| 8 | −1250.82948 | 0.25000 | | | | 200.339 |
| 9 | 275.11695 | 19.73844 | 1.433870 | 95.10 | 0.5373 | 195.449 |
| 10 | 5924.93473 | 1.49615 | | | | 194.464 |
| 11 | 181.00928 | 15.59409 | 1.438750 | 94.66 | 0.5340 | 181.018 |
| 12 | 364.09501 | (variable) | | | | 179.201 |
| 13 | 2611.04787 | 2.80000 | 1.903660 | 31.32 | 0.5946 | 46.719 |
| 14 | 62.46417 | 3.62310 | | | | 41.144 |
| 15 | −278.05117 | 1.70000 | 2.001000 | 29.13 | 0.5997 | 41.887 |
| 16 | 59.18261 | 6.07620 | | | | 39.424 |
| 17 | −72.99201 | 1.72000 | 1.900430 | 37.37 | 0.5774 | 39.427 |
| 18 | 239.08076 | 4.65000 | 1.808095 | 22.76 | 0.6307 | 40.442 |
| 19 | −160.38629 | 0.12000 | | | | 40.964 |
| 20 | 154.80129 | 9.69000 | 1.808095 | 22.76 | 0.6307 | 41.449 |
| 21 | −36.03157 | 1.70000 | 1.816000 | 46.62 | 0.5568 | 41.400 |
| 22 | 11240.10571 | (variable) | | | | 42.358 |
| 23 | 257.78212 | 10.20000 | 1.496999 | 81.54 | 0.5375 | 75.250 |
| 24 | −152.21100 | (variable) | | | | 75.987 |
| 25 | 81.78544 | 15.00000 | 1.437000 | 95.10 | 0.5326 | 79.969 |
| 26 | −290.13783 | 0.12000 | | | | 79.548 |
| 27 | 649.13093 | 5.70000 | 1.437000 | 95.10 | 0.5326 | 77.966 |
| 28 | −635.79082 | 0.12000 | | | | 76.704 |
| 29 | 101.78523 | 2.02000 | 1.800000 | 29.84 | 0.6017 | 72.589 |
| 30 | 50.62806 | 17.00000 | 1.437000 | 95.10 | 0.5326 | 67.465 |
| 31 | −1065.41039 | (variable) | | | | 66.129 |
| 32 (stop) | ∞ | 5.21000 | | | | 34.696 |
| 33 | −145.83445 | 1.50000 | 1.772499 | 49.60 | 0.5520 | 32.135 |
| 34 | 40.64453 | 0.12000 | | | | 30.934 |
| 35 | 37.46411 | 3.99000 | 1.805181 | 25.42 | 0.6161 | 31.040 |
| 36 | 274.92557 | 3.03000 | | | | 30.755 |
| 37 | −62.87569 | 1.50000 | 1.487490 | 70.23 | 0.5300 | 30.464 |
| 38 | −331.93524 | 6.31000 | | | | 30.178 |
| 39 | −119.76380 | 1.80000 | 1.804000 | 46.58 | 0.5573 | 29.106 |
| 40 | 79.04800 | 4.85000 | 1.805181 | 25.42 | 0.6161 | 29.137 |
| 41 | 227.22882 | 1.68000 | | | | 29.163 |
| 42 | −105.51290 | 3.50000 | 1.882997 | 40.76 | 0.5667 | 29.186 |
| 43 | 53.47768 | 9.79000 | 1.540720 | 47.23 | 0.5651 | 30.486 |
| 44 | −49.61881 | 0.12000 | | | | 32.343 |
| 45 | 59.36631 | 14.27000 | 1.834807 | 42.73 | 0.5648 | 33.498 |
| 46 | 76.77071 | 7.92000 | | | | 31.475 |
| 47 | 1676.58760 | 6.38000 | 1.729157 | 54.68 | 0.5444 | 31.950 |
| 48 | −58.74910 | 0.12000 | | | | 32.094 |
| 49 | 1160.20334 | 5.50000 | 1.953750 | 32.32 | 0.5898 | 31.183 |
| 50 | 41.97610 | 1.21000 | | | | 29.566 |
| 51 | 43.59972 | 14.88000 | 1.568832 | 56.36 | 0.5489 | 29.967 |
| 52 | −69.37111 | 0.15000 | | | | 29.344 |
| 53 | 57.08470 | 5.79000 | 1.487490 | 70.23 | 0.5300 | 28.125 |
| 54 | −65.79583 | 3.47000 | 1.953750 | 32.32 | 0.5898 | 27.071 |
| 55 | −136.35307 | 0.25000 | | | | 26.244 |
| 56 | 0.00000 | 1.00000 | 1.516330 | 64.14 | 0.5353 | 25.717 |
| 57 | 0.00000 | 0.10000 | | | | 25.334 |
| 58 | 0.00000 | 33.00000 | 1.608590 | 46.44 | 0.5664 | 60.000 |
| 59 | 0.00000 | 13.20000 | 1.516330 | 64.15 | 0.5352 | 60.000 |
| 60 | 0.00000 | 0.00000 | | | | 60.000 |

Aspheric surface data

13th surface

K = 0.00000e+000  A4 = 3.73226e−007  A6 = −1.85656e−010  A8 = 2.84125e−012
A10 = −1.48139e−014  A12 = 3.95140e−017  A14 = −5.29683e−020  A16 = 2.77998e−023

24th surface

K = 0.00000e+000  A4 = 1.81265e−007  A6 = −2.18673e−010  A8 = 4.54414e−013
A10 = −5.79004e−016  A12 = 4.19988e−019  A14 = −1.58916e−022  A16 = 2.42413e−026

27th surface

K = 0.00000e+000  A4 = −1.75194e−007  A6 = −3.10471e−010  A8 = 6.47038e−013
A10 = −8.69621e−016  A12 = 6.59113e−019  A14 = −2.58923e−022  A16 = 4.09530e−026

-continued

| [Unit mm] | | | |
|---|---|---|---|
| Various data Zoom ratio 110.00 | | | |
| | Wide angle | Middle | Telephoto |
| Focal length | 8.40 | 100.00 | 923.99 |
| F-number | 1.75 | 1.75 | 4.80 |
| Angle of view (deg) | 33.22 | 3.15 | 0.34 |
| Image height | 5.50 | 5.50 | 5.50 |
| Total lens length | 677.22 | 677.22 | 677.22 |
| BF | 13.89 | 13.89 | 13.89 |
| d12 | 3.21 | 153.91 | 191.20 |
| d22 | 297.91 | 97.46 | 2.00 |
| d24 | 1.50 | 14.68 | 1.70 |
| d31 | 2.98 | 39.55 | 110.70 |
| d60 | 13.89 | 13.89 | 13.89 |
| Entrance pupil position | 132.61 | 1065.69 | 11937.60 |
| Exit pupil position | 264.60 | 264.60 | 264.60 |
| Front principal point position | 141.29 | 1205.58 | 16267.00 |
| Rear principal point position | 5.49 | −86.11 | −910.10 |

| Zoom lens unit data | | | | | |
|---|---|---|---|---|---|
| Unit | Start surface | Focal length | Lens structure length | Front principal point position | Rear principal point position |
| 1 | 1 | 250.00 | 124.85 | 73.57 | −16.31 |
| 2 | 13 | −26.50 | 32.08 | 3.49 | −18.78 |
| 3 | 23 | 193.60 | 10.20 | 4.32 | −2.55 |
| 4 | 25 | 110.00 | 39.96 | 5.10 | −22.85 |
| 5 | 32 | 49.37 | 150.64 | 61.48 | 13.93 |

Numerical Embodiment 6

| [Unit mm] | | | | | |
|---|---|---|---|---|---|
| Surface data | | | | | |
| Surface number | r | d | nd | vd | θgF | Effective diameter |
|---|---|---|---|---|---|---|
| 1 | −1061.37564 | 6.00000 | 1.788001 | 47.37 | 0.5559 | 212.004 |
| 2 | 437.88370 | 2.00000 | | | | 203.748 |
| 3 | 446.06598 | 23.92188 | 1.433870 | 95.10 | 0.5373 | 203.452 |
| 4 | −622.49493 | 0.19890 | | | | 202.444 |
| 5 | 915.30360 | 6.00000 | 1.850259 | 32.27 | 0.5929 | 198.861 |
| 6 | 608.63429 | 1.00000 | | | | 198.800 |
| 7 | 471.99209 | 19.57807 | 1.433870 | 95.10 | 0.5373 | 199.772 |
| 8 | −884.56718 | 24.97986 | | | | 199.955 |
| 9 | 404.12448 | 19.24764 | 1.433870 | 95.10 | 0.5373 | 199.211 |
| 10 | −1513.72254 | 0.25000 | | | | 198.630 |
| 11 | 295.70647 | 15.37006 | 1.433870 | 95.10 | 0.5373 | 192.784 |
| 12 | 1140.36416 | 1.49921 | | | | 191.444 |
| 13 | 176.82815 | 17.53882 | 1.438750 | 94.66 | 0.5340 | 179.878 |
| 14 | 396.25334 | (variable) | | | | 177.706 |
| 15 | −265.90829 | 2.20000 | 2.003300 | 28.27 | 0.5980 | 43.317 |
| 16 | 40.28905 | (variable) | | | | 37.709 |
| 17 | −48.69408 | 1.45000 | 1.743198 | 49.34 | 0.5531 | 36.841 |
| 18 | 64.90157 | 10.15625 | 1.892860 | 20.36 | 0.6393 | 39.000 |
| 19 | −46.65078 | 0.94977 | | | | 40.017 |
| 20 | −43.70695 | 2.00000 | 1.882997 | 40.76 | 0.5667 | 39.949 |
| 21 | −238.00409 | (variable) | | | | 42.385 |
| 22 | 245.70301 | 9.91935 | 1.729157 | 54.68 | 0.5444 | 82.223 |
| 23 | −236.88071 | (variable) | | | | 82.831 |
| 24 | 103.55182 | 17.39977 | 1.438750 | 94.66 | 0.5340 | 85.116 |
| 25 | −193.03075 | 1.05104 | | | | 84.448 |
| 26 | 252.55381 | 2.60000 | 1.854780 | 24.80 | 0.6122 | 80.086 |
| 27 | 100.85362 | 1.00000 | | | | 77.180 |
| 28 | 95.22728 | 13.03743 | 1.496999 | 81.54 | 0.5375 | 77.084 |
| 29 | −438.07745 | 2.50000 | 1.854780 | 24.80 | 0.6122 | 76.012 |
| 30 | 523.78139 | 0.20000 | | | | 74.753 |

-continued

| | | [Unit mm] | | | | |
|---|---|---|---|---|---|---|
| 31 | 180.13422 | 8.54326 | 1.603112 | 60.64 | 0.5415 | 74.156 |
| 32 | −300.14000 | (variable) | | | | 73.243 |
| 33 (stop) | ∞ | 5.52545 | | | | 36.079 |
| 34 | −107.41243 | 1.40000 | 1.882997 | 40.76 | 0.5667 | 33.373 |
| 35 | 58.33624 | 0.49984 | | | | 32.524 |
| 36 | 40.86521 | 3.81080 | 1.922860 | 18.90 | 0.6495 | 32.846 |
| 37 | 88.11073 | 5.44329 | | | | 32.257 |
| 38 | −54.21473 | 1.70000 | 1.804000 | 46.53 | 0.5577 | 31.839 |
| 39 | −78.11945 | 7.02652 | | | | 32.153 |
| 40 | 93.33051 | 1.50000 | 1.804000 | 46.53 | 0.5577 | 31.111 |
| 41 | 35.84895 | 4.89868 | 1.846660 | 23.87 | 0.6205 | 30.368 |
| 42 | 78.85313 | 5.49000 | | | | 29.704 |
| 43 | −54.59995 | 1.50000 | 1.891900 | 37.13 | 0.5780 | 29.515 |
| 44 | 79.40629 | 8.36701 | 1.516330 | 64.14 | 0.5353 | 30.594 |
| 45 | −31.23562 | 11.32613 | | | | 31.571 |
| 46 | 336.41962 | 3.58796 | 1.517417 | 52.43 | 0.5564 | 31.321 |
| 47 | −1136.62512 | 2.00000 | | | | 31.189 |
| 48 | 5113.58495 | 1.50000 | 1.882997 | 40.76 | 0.5667 | 31.022 |
| 49 | 35.43620 | 10.23202 | 1.487490 | 70.23 | 0.5300 | 30.800 |
| 50 | −89.05834 | 0.20000 | | | | 31.899 |
| 51 | 81.01290 | 7.80550 | 1.517417 | 52.43 | 0.5564 | 32.333 |
| 52 | −37.38744 | 1.50000 | 1.882997 | 40.76 | 0.5667 | 32.200 |
| 53 | −108.00852 | 0.20000 | | | | 32.754 |
| 54 | 98.80813 | 6.54950 | 1.539956 | 59.46 | 0.5441 | 32.745 |
| 55 | −51.28636 | 10.00000 | | | | 32.439 |
| 56 | 0.00000 | 33.00000 | 1.608590 | 46.44 | 0.5664 | 60.000 |
| 57 | 0.00000 | 13.20000 | 1.516330 | 64.15 | 0.5352 | 60.000 |
| 58 | 0.00000 | 0.00000 | | | | 60.000 |

Aspheric surface data

15th surface

| K = −2.00000e+000 | A4 = 1.26593e−006 | A6 = −2.67796e−008 | A8 = −3.03007e−010 |
|---|---|---|---|
| A10 = 8.75925e−013 | A12 = 3.31947e−015 | A14 = 1.36796e−018 | A16 = 5.79644e−022 |
| A3 = −4.12865e−007 | A5 = 8.74667e−008 | A7 = 3.94668e−009 | A9 = 6.37487e−012 |
| A11 = −8.43915e−014 | A13 = −7.03012e−017 | A15 = −3.91084e−020 | |

23th surface

| K = 1.60380e+001 | A4 = 1.88802e−007 | A6 = −4.95211e−011 | A8 = −1.59588e−014 |
|---|---|---|---|
| A10 = 9.82595e−017 | A12 = −1.39189e−019 | A14 = 1.45831e−023 | A16 = −3.70179e−027 |
| A3 = 1.48240e−008 | A5 = 2.30878e−009 | A7 = 1.81659e−012 | A9 = −2.39785e−015 |
| A11 = 2.10561e−018 | A13 = 1.20846e−021 | A15 = 3.43940e−026 | |

31th surface

| K = −3.11813e+000 | A4 = −3.88068e−007 | A6 = −1.19018e−010 | A8 = −4.23032e−013 |
|---|---|---|---|
| A10 = −3.17181e−016 | A12 = −2.58822e−019 | A14 = 2.86962e−022 | A16 = −3.93678e−026 |
| A3 = 3.18532e−007 | A5 = 5.35389e−009 | A7 = 1.56885e−012 | A9 = 1.95280e−014 |
| A11 = 9.95417e−018 | A13 = −7.08697e−021 | A15 = −3.08479e−025 | |

Various data
Zoom ratio 116.00

| | Wide angle | Middle | Telephoto |
|---|---|---|---|
| Focal length | 8.80 | 100.00 | 1020.79 |
| F-number | 1.75 | 1.75 | 5.30 |
| Angle of view (deg) | 32.01 | 3.15 | 0.31 |
| Image height | 5.50 | 5.50 | 5.50 |
| Total lens length | 681.25 | 681.25 | 681.25 |
| BF | 13.29 | 13.29 | 13.29 |
| d14 | 3.87 | 150.98 | 188.46 |
| d16 | 10.21 | 10.05 | 10.03 |
| d21 | 284.02 | 100.73 | 2.00 |
| d23 | 8.00 | 9.60 | 8.27 |
| d32 | 2.99 | 37.74 | 100.33 |
| d58 | 13.29 | 13.29 | 13.29 |
| Entrance pupil position | 140.13 | 1085.30 | 13261.31 |
| Exit pupil position | 182.18 | 182.18 | 182.18 |
| Front principal point position | 149.39 | 1244.51 | 20452.20 |
| Rear principal point position | 4.49 | −86.71 | −1007.49 |

[Unit mm]

Zoom lens unit data

| Unit | Start surface | Focal length | Lens structure length | Front principal point position | Rear principal point position |
|---|---|---|---|---|---|
| 1 | 1 | 245.00 | 137.58 | 78.95 | −19.22 |
| 2 | 15 | −34.46 | 2.20 | 0.95 | −0.14 |
| 3 | 17 | −102.90 | 14.56 | −0.95 | −9.11 |
| 4 | 22 | 166.13 | 9.92 | 2.94 | −2.84 |
| 5 | 24 | 111.79 | 46.33 | 12.91 | −19.84 |
| 6 | 33 | 45.45 | 148.26 | 62.69 | 16.84 |

Numerical Embodiment 7

[Unit mm]

Surface data

| Surface number | r | d | nd | vd | θgF | Effective diameter |
|---|---|---|---|---|---|---|
| 1 | −359.39541 | 2.50000 | 1.756998 | 47.82 | 0.5565 | 110.247 |
| 2 | 396.59730 | 3.48827 | | | | 109.068 |
| 3 | 3117.01401 | 2.50000 | 1.800999 | 34.97 | 0.5864 | 109.071 |
| 4 | 428.50284 | 10.30551 | 1.537750 | 74.70 | 0.5392 | 109.026 |
| 5 | −298.82473 | 0.20000 | | | | 109.089 |
| 6 | 308.22527 | 11.08859 | 1.433870 | 95.10 | 0.5373 | 107.618 |
| 7 | −319.83576 | 9.00507 | | | | 107.234 |
| 8 | 206.78083 | 7.06825 | 1.433870 | 95.10 | 0.5373 | 105.276 |
| 9 | 902.40762 | 0.20000 | | | | 104.951 |
| 10 | 165.75914 | 8.02404 | 1.433870 | 95.10 | 0.5373 | 103.484 |
| 11 | 654.06410 | 0.20000 | | | | 102.878 |
| 12 | 127.26368 | 8.35035 | 1.438750 | 94.66 | 0.5340 | 99.354 |
| 13 | 366.19607 | (variable) | | | | 98.484 |
| 14 | 145.26698 | 1.00000 | 1.882997 | 40.76 | 0.5667 | 34.868 |
| 15 | 20.06738 | 8.38561 | | | | 29.304 |
| 16 | −71.49829 | 0.90000 | 1.816000 | 46.62 | 0.5568 | 29.319 |
| 17 | 143.17100 | 0.70000 | | | | 29.975 |
| 18 | 64.30732 | 6.38901 | 1.808095 | 22.76 | 0.6307 | 31.008 |
| 19 | −50.80997 | (variable) | | | | 31.148 |
| 20 | −58.23395 | 1.50000 | 1.816000 | 46.62 | 0.5568 | 29.181 |
| 21 | −1675656.65350 | (variable) | | | | 29.21 |
| 22 | −45.23600 | 1.30000 | 1.729157 | 54.68 | 0.5444 | 26.086 |
| 23 | 72.15046 | 3.80394 | 1.846660 | 23.78 | 0.6205 | 27.647 |
| 24 | 21853.29495 | (variable) | | | | 28.366 |
| 25 | −222.66178 | 4.62793 | 1.607379 | 56.81 | 0.5483 | 36.288 |
| 26 | −52.20061 | 0.15000 | | | | 37.081 |
| 27 | 163.22100 | 4.61915 | 1.518229 | 58.90 | 0.5457 | 37.988 |
| 28 | −121.11140 | (variable) | | | | 38.081 |
| 29 (stop) | ∞ | 1.00000 | | | | 37.449 |
| 30 | 40.23219 | 8.82919 | 1.487490 | 70.23 | 0.5300 | 36.927 |
| 31 | −88.68244 | 1.50000 | 1.800999 | 34.97 | 0.5864 | 35.946 |
| 32 | 337.95041 | 0.15000 | | | | 35.024 |
| 33 | 24.49251 | 7.81710 | 1.487490 | 70.23 | 0.5300 | 32.871 |
| 34 | 147.58114 | 1.50000 | 1.882997 | 40.76 | 0.5667 | 31.076 |
| 35 | 22.56434 | 39.70000 | | | | 27.576 |
| 36 | 507.25144 | 5.75009 | 1.575006 | 41.50 | 0.5767 | 29.737 |
| 37 | −36.97174 | 0.20000 | | | | 29.779 |
| 38 | 113.61656 | 1.20000 | 1.816000 | 46.62 | 0.5568 | 27.577 |
| 39 | 19.50969 | 8.03088 | 1.517417 | 52.43 | 0.5564 | 25.539 |
| 40 | −93.99984 | 0.20000 | | | | 25.150 |
| 41 | 26.83452 | 5.64769 | 1.496999 | 81.54 | 0.5375 | 23.655 |
| 42 | −141.82981 | 1.20000 | 1.882997 | 40.76 | 0.5667 | 22.222 |
| 43 | 32.89802 | 1.00000 | | | | 20.831 |
| 44 | 19.84821 | 2.85682 | 1.517417 | 52.43 | 0.5564 | 20.398 |
| 45 | 34.69000 | 3.80000 | | | | 19.635 |
| 46 | 0.00000 | 33.00000 | 1.608590 | 46.44 | 0.5664 | 31.250 |
| 47 | 0.00000 | 13.20000 | 1.516800 | 64.17 | 0.5347 | 31.250 |
| 48 | 0.00000 | 0.00000 | | | | 31.250 |

-continued

|[Unit mm]|
|---|

| Aspheric surface data |
| 21th surface |

$K = -6.77371e+015$  $A4 = -3.77917e-006$  $A6 = -3.26883e-009$  $A8 = -1.31120e-011$

| Various data |
| Zoom ratio 40.00 |

|  | Wide angle | Middle | Telephoto |
|---|---|---|---|
| Focal length | 10.00 | 65.00 | 400.00 |
| F-number | 2.10 | 2.09 | 4.00 |
| Angle of view (deg) | 28.81 | 4.84 | 0.79 |
| Image height | 5.50 | 5.50 | 5.50 |
| Total lens length | 390.24 | 390.24 | 390.24 |
| BF | 8.90 | 8.90 | 8.90 |
| d13 | 0.48 | 92.42 | 121.54 |
| d19 | 4.06 | 8.29 | 3.80 |
| d21 | 123.36 | 16.81 | 16.94 |
| d24 | 14.95 | 27.67 | 1.80 |
| d28 | 5.61 | 3.26 | 4.37 |
| d48 | 8.90 | 8.90 | 8.90 |
| Entrance pupil position | 72.77 | 529.32 | 2342.06 |
| Exit pupil position | −377.90 | −377.90 | −377.90 |
| Front principal point position | 82.51 | 583.40 | 2328.41 |
| Rear principal point position | −1.10 | −56.10 | −391.10 |

| Zoom lens unit data |

| Unit | Start surface | Focal length | Lens structure length | Front principal point position | Rear principal point position |
|---|---|---|---|---|---|
| 1 | 1 | 153.00 | 62.93 | 38.89 | −4.51 |
| 2 | 14 | −54.00 | 17.37 | −9.61 | −28.95 |
| 3 | 20 | −71.01 | 1.50 | −0.00 | −0.82 |
| 4 | 22 | −68.92 | 5.10 | −0.08 | −2.88 |
| 5 | 25 | 60.94 | 9.40 | 4.18 | −1.87 |
| 6 | 29 | 81.82 | 136.58 | 65.16 | −57.82 |

Numerical Embodiment 8

|[Unit mm]|
|---|

| Surface data |

| Surface number | r | d | nd | vd | θgF | Effective diameter |
|---|---|---|---|---|---|---|
| 1 | −3219.15445 | 6.00000 | 1.834810 | 42.74 | 0.5648 | 210.248 |
| 2 | 339.26740 | 5.59717 |  |  |  | 203.223 |
| 3 | 356.24760 | 23.70767 | 1.433870 | 95.10 | 0.5373 | 203.057 |
| 4 | −871.03373 | 0.20000 |  |  |  | 202.444 |
| 5 | 467.87855 | 13.73745 | 1.433870 | 95.10 | 0.5373 | 195.837 |
| 6 | 39813.87540 | 25.96905 |  |  |  | 194.406 |
| 7 | 384.96497 | 19.32556 | 1.433870 | 95.10 | 0.5373 | 191.431 |
| 8 | −1082.76913 | 0.25000 |  |  |  | 190.992 |
| 9 | 321.58358 | 13.50574 | 1.433870 | 95.10 | 0.5373 | 185.735 |
| 10 | 1351.63455 | 1.49946 |  |  |  | 184.602 |
| 11 | 202.07209 | 13.83704 | 1.438750 | 94.66 | 0.5340 | 175.517 |
| 12 | 427.28548 | (variable) |  |  |  | 173.802 |
| 13 | 760.08161 | 2.20000 | 2.003300 | 28.27 | 0.5980 | 44.275 |
| 14 | 39.94114 | 10.37173 |  |  |  | 38.538 |
| 15 | −45.16372 | 1.40000 | 1.882997 | 40.76 | 0.5667 | 37.716 |
| 16 | 119.39260 | 8.19008 | 1.922860 | 18.90 | 0.6495 | 38.654 |
| 17 | −48.49175 | 0.80490 |  |  |  | 39.198 |
| 18 | −46.39487 | 1.60000 | 1.816000 | 46.62 | 0.5568 | 39.269 |
| 19 | −169.96654 | (variable) |  |  |  | 41.502 |
| 20 | 135.90703 | 15.91651 | 1.618000 | 63.33 | 0.5441 | 85.297 |
| 21 | −142.70113 | 0.20000 |  |  |  | 85.785 |
| 22 | 106.01111 | 14.73798 | 1.595220 | 67.74 | 0.5442 | 85.496 |
| 23 | −310.53242 | 0.20000 |  |  |  | 84.543 |

-continued

[Unit mm]

| | | | | | | |
|---|---|---|---|---|---|---|
| 24 | 207.22121 | 2.30000 | 1.805181 | 25.42 | 0.6161 | 79.343 |
| 25 | 61.58210 | 16.54703 | 1.438750 | 94.93 | 0.5340 | 73.195 |
| 26 | 0.00000 | 3.07020 | | | | 71.493 |
| 27 | −2129.44793 | 4.87762 | 1.603112 | 60.64 | 0.5415 | 70.015 |
| 28 | −265.82673 | (variable) | | | | 69.095 |
| 29 (stop) | ∞ | 2.34389 | | | | 32.240 |
| 30 | −131.63184 | 1.40000 | 1.882997 | 40.76 | 0.5667 | 31.268 |
| 31 | 48.80082 | 5.81685 | 1.846660 | 23.78 | 0.6205 | 30.188 |
| 32 | −604.15816 | 3.93674 | | | | 29.470 |
| 33 | −68.61027 | 1.85376 | 1.816000 | 46.62 | 0.5568 | 33.200 |
| 34 | 91.87822 | 0.14994 | | | | 33.000 |
| 35 | 38.45136 | 4.43200 | 1.808095 | 22.76 | 0.6307 | 33.400 |
| 36 | 471.29146 | 2.54455 | | | | 33.300 |
| 37 | −98.12201 | 1.57966 | 1.882997 | 40.76 | 0.5667 | 33.200 |
| 38 | 77.01058 | 4.99993 | | | | 33.300 |
| 39 | −47.95666 | 2.00000 | 1.800999 | 34.97 | 0.5864 | 27.096 |
| 40 | 855.90747 | 6.40869 | 1.516330 | 64.14 | 0.5353 | 28.471 |
| 41 | −31.49626 | 0.48845 | | | | 29.545 |
| 42 | −73.02060 | 1.90641 | 1.647689 | 33.79 | 0.5938 | 29.790 |
| 43 | −117.83965 | 3.89264 | 1.639999 | 60.08 | 0.5370 | 30.331 |
| 44 | −49.24783 | 2.24785 | | | | 30.857 |
| 45 | 198.54428 | 10.14730 | 1.639999 | 60.08 | 0.5370 | 30.542 |
| 46 | 56.51148 | 6.10415 | | | | 29.433 |
| 47 | −513.77698 | 3.28309 | 1.540720 | 47.23 | 0.5651 | 30.183 |
| 48 | −72.97308 | 3.12464 | | | | 30.457 |
| 49 | 26485.31295 | 3.07334 | 1.834000 | 37.16 | 0.5776 | 30.418 |
| 50 | 57.52585 | 5.33615 | 1.487490 | 70.23 | 0.5300 | 30.392 |
| 51 | −76.11088 | 0.20000 | | | | 30.607 |
| 52 | 246.77943 | 5.12050 | 1.496999 | 81.54 | 0.5375 | 30.573 |
| 53 | −41.99755 | 2.50000 | 1.882997 | 40.76 | 0.5667 | 30.480 |
| 54 | −98.95452 | 1.18171 | | | | 30.973 |
| 55 | 70.49015 | 8.22548 | 1.518229 | 58.90 | 0.5457 | 30.808 |
| 56 | −62.95156 | 10.00000 | | | | 30.503 |
| 57 | 0.00000 | 33.00000 | 1.608590 | 46.44 | 0.5664 | 60.000 |
| 58 | 0.00000 | 13.20000 | 1.516330 | 64.15 | 0.5352 | 60.000 |
| 59 | 0.00000 | 0.00000 | | | | 60.000 |

Aspheric surface data

13th surface

K = −1.83797e+003  A4 = 1.29958e−006  A6 = −7.74148e−010  A8 = 5.40070e−013

21th surface

K = −9.62897e+000  A4 = 8.42919e−008  A6 = 3.91480e−011  A8 = −5.61496e−015

27th surface

K = 2.66795e+003  A4 = 1.19175e−007  A6 = −1.51584e−010  A8 = 2.81676e−014

Various data
Zoom ratio 120.00

| | Wide angle | Middle | Telephoto |
|---|---|---|---|
| Focal length | 8.70 | 100.00 | 1044.00 |
| F-number | 1.80 | 1.80 | 5.70 |
| Angle of view (deg) | 32.30 | 3.15 | 0.30 |
| Image height | 5.50 | 5.50 | 5.50 |
| Total lens length | 667.84 | 667.84 | 667.84 |
| BF | 11.41 | 11.41 | 11.41 |
| d12 | 2.65 | 166.32 | 205.85 |
| d19 | 295.51 | 104.66 | 1.81 |
| d28 | 1.73 | 28.90 | 92.23 |
| d59 | 11.41 | 11.41 | 11.41 |
| Entrance pupil position | 130.08 | 1108.66 | 13587.09 |
| Exit pupil position | 178.89 | 178.89 | 178.89 |
| Front principal point position | 139.23 | 1268.37 | 21139.00 |
| Rear principal point position | 2.71 | −88.59 | −1032.59 |

-continued

[Unit mm]

Zoom lens unit data

| Unit | Start surface | Focal length | Lens structure length | Front principal point position | Rear principal point position |
|---|---|---|---|---|---|
| 1 | 1 | 261.57 | 123.63 | 76.69 | −13.64 |
| 2 | 13 | −26.00 | 24.57 | 3.71 | −14.10 |
| 3 | 20 | 66.00 | 57.85 | 10.60 | −29.75 |
| 4 | 29 | 41.67 | 150.50 | 56.36 | 19.08 |

TABLE 1

| Conditional Expression | Numerical Embodiment | | | | | | | |
|---|---|---|---|---|---|---|---|---|
| | 1 | 2 | 3 | 4 | 5 | 6 | 7 | 8 |
| (1) f1n/f1 | −1.43 | −1.62 | −1.19 | −1.31 | −1.43 | −1.59 | −1.62 | −1.40 |
| (2) ν1n | 42.74 | 37.16 | 47.37 | 40.76 | 42.74 | 47.37 | 47.82 | 42.74 |
| (3) νpave | 95.01 | 89.68 | 95.10 | 88.31 | 95.01 | 95.01 | 90.93 | 95.01 |
| (4) (θpave − θnave)/(νpave − νnave) | −5.39E−04 | −7.66E−04 | −3.90E−04 | −6.09E−04 | −5.39E−04 | −6.84E−04 | −6.95E−04 | −5.39E−04 |
| (5) f1n/f2p | −0.61 | −0.70 | −0.57 | −0.53 | −0.52 | −0.65 | 0.40 | −0.62 |
| (6) f1n/f3p | −0.36 | −0.25 | −0.38 | −0.47 | −0.41 | 0.18 | −0.75 | −0.34 |
| (7) ft/f1 | 4.06 | 4.28 | 3.44 | 3.26 | 3.70 | 4.17 | 2.61 | 3.99 |
| f1n | −358.42 | −402.79 | −298.93 | −321.47 | −357.75 | −390.73 | −247.48 | −365.34 |
| f1 | 251.50 | 248.00 | 251.80 | 245.21 | 250.00 | 245.00 | 153.00 | 261.57 |
| θpave | 0.5366 | 0.5374 | 0.5373 | 0.5377 | 0.5366 | 0.5366 | 0.5370 | 0.54 |
| θnave | 0.5648 | 0.5776 | 0.5559 | 0.5667 | 0.5648 | 0.5744 | 0.5715 | 0.56 |
| νpave | 95.01 | 89.68 | 95.10 | 88.31 | 95.01 | 95.01 | 90.93 | 95.01 |
| νnave | 42.74 | 37.16 | 47.37 | 40.76 | 42.74 | 39.82 | 41.40 | 42.74 |
| f2p | 588.08 | 578.88 | 525.52 | 611.72 | 688.70 | 601.51 | −616.31 | 584.71 |
| f3p | 995.95 | 1580.18 | 796.50 | 677.69 | 878.61 | −2140.25 | 327.97 | 1088.36 |
| ft | 1020.00 | 1062.49 | 866.25 | 799.99 | 923.99 | 1020.79 | 400.00 | 1044.00 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-034959, filed Feb. 28, 2018, which is hereby incorporated by reference herein in its entirety.

What is claimed is:

1. A zoom lens consisting of, in order from an object side to an image side, a first lens unit having a positive refractive power and configured not to be moved for zooming, a second lens unit having a negative refractive power and configured to be moved for zooming, and a rear lens group including at least one lens unit, wherein
the first lens unit includes at least six lenses,
a lens closest to the object side included in the first lens unit is a negative lens, and
the zoom lens satisfies conditional expressions $-1.65 < f1n/f1 < -1.10$, $37 < \nu 1n < 48$, $87 < \nu pave < 100$, and $3.26 \leq ft/f1 < 6.0$, where f1n is a focal length of the negative lens, ν1n is an Abbe number of the negative lens with respect to d-line, f1 is a focal length of the first lens unit, and νpave is an average of Abbe numbers of positive lenses included in the first lens unit with respect to d-line, f1 is a focal length of the zoom lens at a telephoto end, the Abbe number νd with respect to d-line being expressed by an expression $\nu d = (Nd-1)/(NF-NC)$, where NF is a refractive index with respect to F-line, NC is a refractive index with respect to C-line, and Nd is a refractive index with respect to d-line.

2. The zoom lens according to claim 1, wherein the first lens unit consists of, in order from the object side to the image side, a 1-1 lens subunit configured not to be moved for focusing and a 1-2 lens subunit configured to be moved for focusing.

3. The zoom lens according to claim 2, wherein the 1-1 lens subunit includes, in order from the object side to the image side, a 1n lens as the negative lens, a 2p lens having a positive refractive power, and a 3p lens having a positive refractive power.

4. The zoom lens according to claim 3, wherein the 1n lens is a biconcave lens.

5. The zoom lens according to claim 3, wherein the zoom lens satisfies conditional expressions $-0.9 < f1n/f2p < -0.3$, and $-0.80 < f1n/f3p < -0.15$, where f1n is a focal length of the 1n lens, f2p is a focal length of the 2p lens, and f3p is a focal length of the 3p lens.

6. The zoom lens according to claim 1, wherein the zoom lens satisfies a conditional expression $-9.0 \times 10^{-4} < (\theta pave - \theta nave)/(\nu pave - \nu nave) < -3.0 \times 10^{-4}$ where νpave is an average of Abbe numbers of the positive lenses with respect to d-line, νnave is an average of Abbe numbers of negative lenses included in the first lens unit with respect to d-line, θpave is an average of partial dispersion ratios of the positive lenses, and θnave is an average of partial dispersion ratios of the negative lenses, the partial dispersion ratio θ being expressed by an expression $$\theta = (Ng - NF)/(NF - NC),$$

where Ng is a refractive index with respect to g-line.

7. An image pickup apparatus comprising:
a zoom lens comprising, in order from an object side to an image side, a first lens unit having a positive refractive power and configured not to be moved for zooming, a second lens unit having a negative refractive power and configured to be moved for zooming, and a rear lens group including at least one lens unit, wherein
the first lens unit includes at least six lenses,
a lens closest to the object side included in the first lens unit is a negative lens, and
the zoom lens satisfies conditional expressions $$-1.65 < f1n/f1 < -1.10,$$

$$37 < \nu 1n < 48,$$

$$87 < \nu pave < 100, \text{ and}$$

$$3.26 \leq ft/f1 < 6.0,$$

where f1n is a focal length of the negative lens, ν1n is an Abbe number of the negative lens with respect to d-line, f1 is a focal length of the first lens unit, and νpave is an average of Abbe numbers of positive lenses included in the first lens unit with respect to d-line, ft is a focal length of the zoom lens at a telephoto end, the Abbe number νd with respect to d-line being expressed by an expression $$\nu d = (Nd - 1)/(NF - NC),$$

where NF is a refractive index with respect to F-line, NC is a refractive index with respect to C-line, and Nd is a refractive index with respect to d-line; and
an image pickup element disposed on an image plane of the zoom lens.

* * * * *